(12) United States Patent
Fotopoulos et al.

(10) Patent No.: US 11,061,521 B2
(45) Date of Patent: *Jul. 13, 2021

(54) SYSTEM AND METHOD FOR GENERATING CORRECTED SENSOR DATA

(71) Applicant: SYNAPTICS INCORPORATED, San Jose, CA (US)

(72) Inventors: Nickolas V. Fotopoulos, San Jose, CA (US); Katayoun Goudarzi, Los Gatos, CA (US); Tracy Scott Dattalo, Santa Clara, CA (US); Joseph Kurth Reynolds, San Jose, CA (US); Jonathan Losh, Mountain View, CA (US); Renuka Vidyut Shenoy, San Jose, CA (US); Derek Solven, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 16/533,482

(22) Filed: Aug. 6, 2019

(65) Prior Publication Data

US 2021/0041988 A1 Feb. 11, 2021

(51) Int. Cl.
*G06F 3/044* (2006.01)
*G06F 3/041* (2006.01)

(52) U.S. Cl.
CPC .......... *G06F 3/0446* (2019.05); *G06F 3/0418* (2013.01)

(58) Field of Classification Search
CPC ....... G06F 3/044; G06F 3/0446; G06F 3/0418
See application file for complete search history.

(56) References Cited

U.S. PATENT DOCUMENTS

| | | | |
|---|---|---|---|
| 9,753,570 B2 | 9/2017 | Reynolds et al. | |
| 9,965,105 B2* | 5/2018 | Hoch | G06F 3/0446 |
| 10,088,942 B2* | 10/2018 | Shepelev | G06F 3/04166 |
| 2008/0162996 A1 | 7/2008 | Krah et al. | |
| 2010/0292945 A1 | 11/2010 | Reynolds et al. | |
| 2011/0006832 A1 | 1/2011 | Land et al. | |
| 2015/0015528 A1* | 1/2015 | Vandermeijden | G06F 3/0446 345/174 |
| 2015/0054752 A1* | 2/2015 | Mackey | G06F 3/0446 345/173 |
| 2017/0192605 A1* | 7/2017 | Goudarzi | G06F 3/0412 |
| 2017/0285797 A1* | 10/2017 | Shepelev | G06F 3/0447 |
| 2017/0364184 A1 | 12/2017 | Weinerth et al. | |

* cited by examiner

*Primary Examiner* — Ricardo Osorio
(74) *Attorney, Agent, or Firm* — Leydig, Voit & Mayer, Ltd.

(57) ABSTRACT

A system and method for capacitive sensing comprise acquiring first capacitive sensor data and second capacitive sensor data from a plurality of sensor electrodes, and determining positional information from one or more input objects based on the first capacitive sensor data and the second capacitive sensor data. The plurality of sensor electrodes are driven with transcapacitive sensing signals for capacitive sensing during one or more transcapacitive sensing blocks to acquire the first sensor data. Each of the transcapacitive sensing signals is based on a respective one of a plurality of codes. Further, the plurality of sensor electrodes are operated for absolute capacitive sensing during one or more absolute capacitive sensing blocks to acquire the second capacitive sensor data.

12 Claims, 15 Drawing Sheets

Profile Along First Sensor Electrodes

Profile Along Second Sensor Electrodes

SYSTEM AND METHOD FOR GENERATING CORRECTED SENSOR DATA

BACKGROUND

Field

The disclosure herein is generally related to electronic devices, and more specifically, to capacitive sensing devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

SUMMARY

In one embodiment, a method for capacitive sensing comprises acquiring first capacitive sensor data from a plurality of sensor electrodes by operating the plurality of sensor electrodes for transcapacitive sensing signals during one or more transcapacitive sensing blocks. The method further comprises acquiring second capacitive sensor data from the plurality of sensor electrodes by operating the sensor electrodes for absolute capacitive sensing during a first one or more absolute capacitive sensing blocks. Further, the method comprises determining positional information for an input object based on the first capacitive sensor data and the second capacitive sensor data.

In one embodiment, a processing system comprises a sensor module and a determination module. The sensor module comprises sensor circuitry and is configured to acquire first capacitive sensor data from a plurality of sensor electrodes during a first capacitive frame by operating the plurality of sensor electrodes for transcapacitive sensing signals during one or more transcapacitive sensing blocks. The sensor module is further configured to acquire second capacitive sensor data from the plurality of sensor electrodes by operating the sensor electrodes for absolute capacitive sensing during a first one or more absolute capacitive sensing blocks. The determination module is configured to determine positional information for an input object based on the first capacitive sensor data and the second capacitive sensor data.

In one embodiment, an input device comprises a plurality of sensor electrodes and a processing system. The processing system is coupled to the plurality of sensor electrodes. The processing system is configured to acquire first capacitive sensor data from the plurality of sensor electrodes by operating the plurality of sensor electrodes for transcapacitive sensing signals during one or more transcapacitive sensing blocks. The processing system is further configured to acquire second capacitive sensor data from the plurality of sensor electrodes by operating the plurality of sensor electrodes for absolute capacitive sensing during a first one or more absolute capacitive sensing blocks. Further, the processing system is configured to determine positional information for an input object based on the first capacitive sensor data and the second capacitive sensor data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
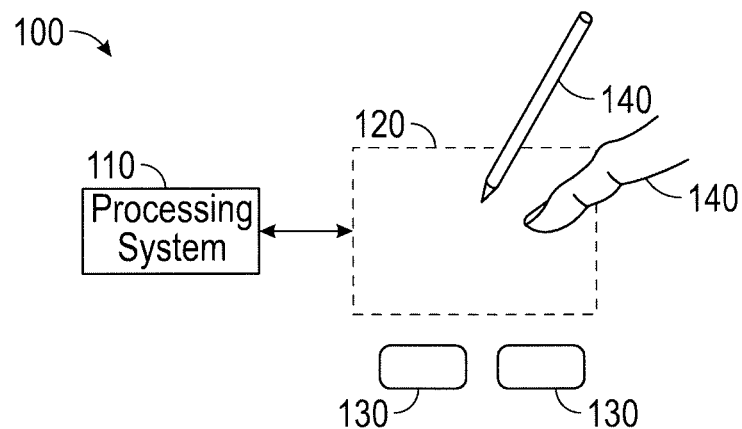
FIG. 1 illustrates an example input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

An example input device 100 as shown in FIG. 1 in accordance with embodiments of the disclosure may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs) and multi-media entertainment devices of automobiles. Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device configured to sense input provided by one or more input objects 140 in a sensing region 120. Example input objects 140 include fingers and styli, as shown in FIG. 1. An exemplary proximity sensor device may be a touchpad, a touch screen, a touch sensor device and the like.

The sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100; contact with an input surface, e.g. a touch surface, of the input device 100: contact with an input surface of the input device 100 coupled with some amount of applied force or pressure; and/or a combination thereof. In various embodiments, input surfaces may be provided by surfaces of casings within which the sensor electrodes (also referred to herein as sensing electrodes) reside, by face sheets applied over the sensor electrodes or any casings, etc. In some embodiments, the sensing region 120 has a rectangular shape when projected onto an input surface of the input device 100. An input object that is not in contact with any surfaces of the input device 100 may be referred to as a hovering input object.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images (e.g. of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g. system ground, and by detecting the capacitive coupling between the sensor electrodes and input objects. In some implementations sensing elements may be formed of a substantially transparent metal mesh (e.g. a reflective or absorbing metallic film patterned to minimize visible transmission loss from the display sub-pixels). Further, the sensor electrodes may be disposed over a display of a display device. The sensing electrodes may be formed on a common substrate of a display device (e.g. on the encapsulation layer of a rigid or flexible organic light emitting diode (OLED) display). An additional dielectric layer with vias for a jumper layer may also be formed of a substantially transparent metal mesh material (e.g. between the user input and an OLED cathode). The jumpers of the jumper layer may be coupled to the electrodes of a first group and cross over sensor electrodes of a second group.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transcapacitive sensing signals. Receiver sensor electrodes may be held substantially constant relative to the reference voltage or modulated relative to the transmitter sensor electrodes to facilitate receipt of resulting signals. A resulting signal may comprise effect(s) corresponding to one or more transcapacitive sensing signals, and/or to one or more sources of environmental interference, e.g. other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor (e.g. a mobile device application processor or any other central processing unit) of the phone. In some embodiments, the processing system 110 is dedicated to implementing the input device 100. In other embodiments, the processing system 110 also performs other functions, such as operating display screens, driving haptic actuators, etc.

Figure 2:
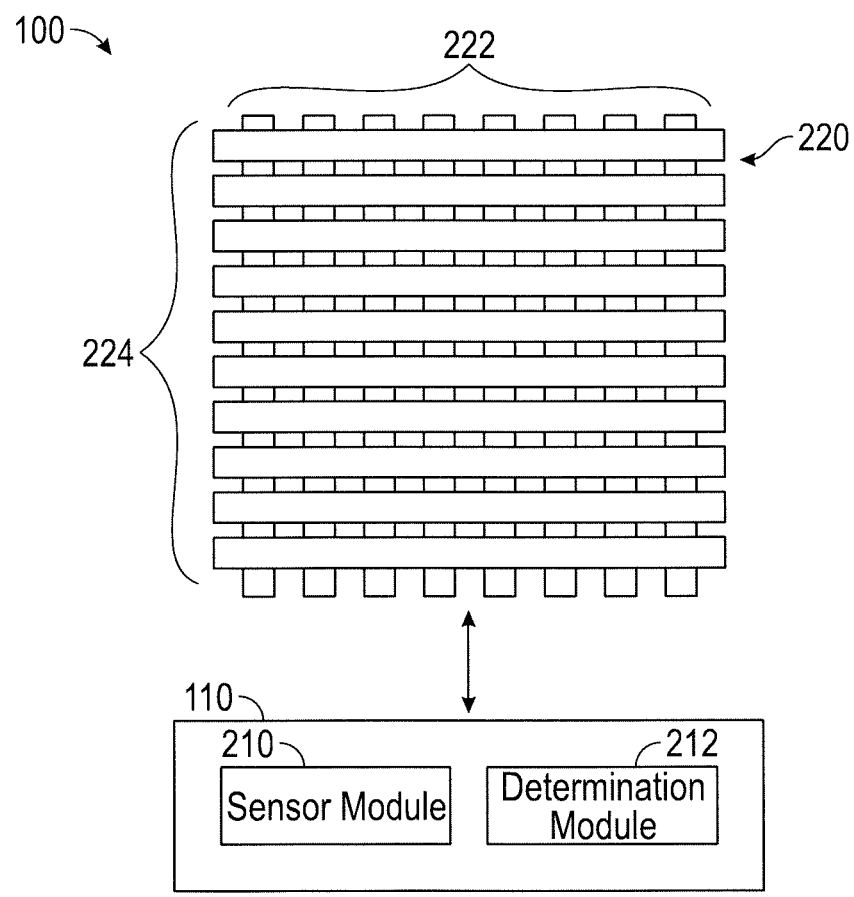
FIG. 2 is a schematic block diagram of an input device, according to one or more embodiments.

The processing system 110 may be implemented as a set of modules that handle different functions of the processing system 110. Each module may comprise circuitry that is a part of the processing system 110, firmware, software, or a combination thereof. In various embodiments, different combinations of modules may be used. FIG. 2 illustrates two example modules: a sensor module 210 and a determination module 212. The sensor module 210 may operate hardware such as sensor electrodes and display screens, and the determination module 212 may process data such as sensor signals and positional information, and report information. Further, the sensor module 210 may operate sensing element(s) to detect input, and the determination module 212 may identify gestures such as mode changing gestures, and change operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g. for FIR digital or IIR switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g. subpixel data signal, gate select and deselect signal, or emission control signal) which are spatially filtered (e.g. demodulated and accumulated) and removed from the lower spatial frequency sensing baseline. Further, a baseline may compensate for a capacitive coupling between the sensor electrodes and one or more nearby electrodes. The nearby electrodes may be display electrodes, dummy sensor electrodes, and or other conductive objects that may be capacitively coupled with the sensor electrodes. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes positions on a surface or position and velocity along an axis. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

FIG. 2 illustrates input device 100, according to one or more embodiments. The input device 100 includes sensor electrodes 220 which are coupled to processing system 110. The sensor electrodes 220 include sensor electrodes 222 and sensor electrodes 224. In one embodiment, the sensor electrodes 222 are disposed on a first layer and the sensor electrodes 224 are disposed on a second layer. For example, the sensor electrodes 222 may be disposed on a first substrate and the sensor electrodes 224 may be disposed on a second substrate. Further, the sensor electrodes 222 may be disposed on a first side of a first substrate and the second sensor electrodes may be disposed on a second side of the first substrate. In one or more embodiments, the sensor electrodes 222 and the sensor electrodes 224 may be disposed on a common side of a substrate. In such embodiments, the sensor electrodes 222 and the sensor electrodes 224 may be non-overlapping or may be overlapping and one of the sensor electrodes 222 and the sensor electrodes 224 includes jumpers in the overlapping regions that isolate the sensor electrodes 222 from the sensor electrodes 224.

The sensor electrodes 220 may have any shape, size and/or orientation. For example, the sensor electrodes 220 may be arranged in a two-dimensional array as illustrated in FIG. 2. Alternatively, the sensor electrodes 220 may be arranged as a matrix of non-overlapping sensor electrodes. Each of the sensor electrodes 220 may be substantially rectangular in shape. In one or more embodiments, the sensor electrodes 220 may have other shapes. Further, each of the sensor electrodes 220 may have the same shape and/or size. In other embodiments, at least one sensor electrode may have a different shape and/or size than another sensor electrode. In various embodiments, the sensor electrodes 220 may be diamond shaped, have interdigitated fingers to increase field coupling, and/or have floating cut-outs inside to reduce stray capacitance to nearby electrical conductors.

The sensor module 210 may include hardware and firmware elements configured to drive the sensor electrodes 220 to acquire sensor data. For example, the sensor module 210 may include receiver circuitry configured to receive resulting signals from one or more of the sensor electrodes 220. Additionally, the sensor module 210 may include transmitter circuitry configured to drive sensing signals onto one or more of the sensor electrodes 220. The transmitter circuitry may include one or more amplifiers configured to drive sensing signals onto one or more of the sensor electrodes 220. The amplifiers may correspond to one or more buffers or modulators. Further, the receiver circuitry may include analog front ends (AFEs) configured to receive resulting signals from one or more of the sensor electrodes 220. The sensing signals may include transcapacitive sensing signals for transcapacitive sensing and absolute capacitive sensing signals for absolute capacitive sensing. In one embodiment, the sensor module 210 is configured to operate the sensor electrodes 220 for absolute capacitive sensing by driving one or more of the sensor electrodes 220 with one or more absolute capacitive sensing signals while receiving resulting signals from the driven sensor electrodes. Further, the sensor module 210 may be configured to operate the sensor electrodes 220 for transcapacitive sensing by driving one or more of the sensor electrodes 220 with a transcapacitive sensing signal and receiving resulting signal from another one or more of the sensor electrodes 220. The sensor electrodes 220 driven with the transcapacitive sensing signal may be referred to as a transmitter electrode and the sensor electrodes 220 operated to receive resulting signals may be referred to as receiver electrodes.

In one embodiment, the sensing signals may be varying voltage signals that vary between at least two voltages. Further, each of the sensing signals may include a plurality of sensing bursts. In various embodiments, each sensing bursts may include a plurality of voltage transitions. In one or more embodiments, the sensor module 210 may maintain the receiver electrodes at a substantially constant voltage (e.g. relative to system ground) or modulate the receiver electrodes relative to the transmitter electrodes. In one embodiment, when the receiver electrodes are modulated (e.g. relative to system ground), the transmitter electrodes are modulated relative to the receiver electrodes, such that the transmitter electrodes are modulated at a different phase, polarity, amplitude, and/or frequency than the receiver electrodes. In one or more embodiments, the sensor module 210 receives resulting signals with the receiver electrodes and the determination module measures the resulting signals to determine a measurement of the change in capacitive coupling between the receiver electrodes and the transmitter electrodes.

The sensor module 210 may be configured to drive each of the transmitter electrodes one at a time, or simultaneously drive at least two of the transmitter electrodes. In one embodiment, the sensor module 210 is configured to simultaneously drive at least two transmitter electrodes with different transcapacitive sensing signals based on different codes or frequencies. For example, multiple transmitter electrodes may be simultaneously driven with transcapacitive sensing signals which are modulated with substantially orthogonal coded sequences (e.g. amplitude shifted, phase shifted, frequency shifted). The corresponding resulting signals may be decoded to independently determine the changes in capacitive couplings between the transmitter electrodes and the receiver electrodes.

In various embodiments, the sensor electrodes 220 are operated for absolute capacitive sensing by the sensor module 210. In such embodiments, each of the sensor electrodes 220 may be modulated relative to a reference voltage (e.g., system or device ground) with an absolute capacitive sensing signal by the sensor module 210 such that the sensor module 210 receives resulting signals from the modulated (or driven) sensor electrodes. The sensor driver 250 may be configured to determine changes in a capacitive coupling between each modulated sensor electrode and an input object (e.g., the input object 140) from the resulting signals. In one embodiment, each of the sensor electrodes 220 may be simultaneously operated for absolute capacitive sensing, such that a different resulting signal is simultaneously received from each of the sensor electrodes or a common resulting signal from two or more sensor senor electrodes. In another embodiment, the sensor electrodes 222 may be operated for absolute capacitive sensing during a first period and the sensor electrodes 224 may be operated for capacitive sensing during a second period that is non-overlapping with the first period. For example, to allow sharing of receiver circuitry between the two sets of sensor electrodes 222 and 224, the sensor electrodes 222 and 224 may be operated for absolute capacitive sensing during non-overlapping periods. When the sensor electrode 222, 224 are not operated for absolute capacitive sensing, the sensor electrodes may be modulated with a guard signal to minimize charge coupling between the sensor electrodes operated for absolute capacitive sensing and the sensor electrodes not operated for absolute capacitive sensing. The guard signal is a varying voltage signal. Further, the guard signal and the absolute capacitive sensing signal may be similar in at least one of phase, amplitude and polarity. Further, one or more of the sensor electrodes 222, 224 may be over-guarded to subtract excess charge from the other set. Over-guarding may include driving one or more of the sensor electrodes 222, 224 with a guard signal having a similar phase to the absolute capacitive sensing signal, but with a larger amplitude than the absolute capacitive sensing signal.

In various embodiments, a first one of the sensor electrodes 224 may be driven with a transcapacitive sensing signal and a first one of the sensor electrodes 222 may be utilized to receive a resulting signal. Alternatively, a first one of the sensor electrodes 222 may be driven with a transcapacitive sensing signal and a first one of the sensor electrodes 224 may be utilized to receive a resulting signal. In one or more embodiments, a first one of the sensor electrodes 222 may be driven with a transcapacitive sensing signal and a second one of the sensor electrodes 222 may be utilized to receive a resulting signal. Further, in one or more embodiments, a first one of the sensor electrodes 224 may be driven with a transcapacitive sensing signal and a second one of the sensor electrodes 224 may be utilized to receive a resulting signal. Further, one of the sensor electrodes 222 and/or one of the sensor electrodes 224 may be driven with a system ground voltage or electrically floated. In one embodiment, receiving the resulting signals may comprise sampling the resulting signals to generate one or more samples. In various embodiments, receiving the resulting signals may comprise accumulating charge.

In one embodiment, a first receiver of the receiver circuitry may simultaneously receive a resulting from two or more sensor electrodes 220. Further, in such an embodiment, the first receiver may modulate the two or more sensor electrodes 220 with an absolute capacitive sensing signal to simultaneously receive a resulting signal from the two or more sensor electrodes 220. Alternatively, the two or more sensor electrodes may be unmodulated, e.g., driven with a substantially constant voltage or electrically floated.

In some touch screen embodiments, one or more of the sensor electrodes 220 comprise one or more display electrodes used in updating the display of the display screen. In one or more embodiment, the display electrodes comprise one or more segments of a Vcom electrode (common electrodes), a source drive line, gate line, an anode electrode, a cathode electrode, or any other display element. These display electrodes may be disposed on an appropriate display screen substrate. For example, the common electrodes may be disposed on the transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over or under an emissive layer (OLED), etc. In one or more embodiments, the common electrode or electrodes may be utilized for both capacitive sensing and display updating and may be referred to as "combination electrode", since it performs multiple functions. In various embodiments, the common electrode may be segmented to form a plurality of common electrodes and each of the sensor electrodes 220 comprises one or more common electrode.

The areas of localized capacitive sensing of capacitive couplings may be termed "capacitive pixels." The capacitive pixels may be formed between individual sensor electrodes of the sensor electrodes 220 and a reference voltage in embodiments employing absolute capacitive sensing methods. Further, in embodiments employing transcapacitive sensing signals, between groups of sensor electrodes 220 used as transmitter and receiver electrodes. For example, in an embodiment employing absolute capacitive sensing, the capacitive pixels may be formed where parallel fields from the input object 140 couple to system ground of the input device 100. Further, in embodiments employing transcapacitive sensing method, the capacitive pixels may be formed where fringing fields of a first sensor electrode couple to a neighboring sensor electrode most strongly. In various embodiments, a set of measurements between the sensor electrodes 220 or between the sensor electrodes 220 and an input object may be utilized by the determination module 212 to form the capacitive pixels of a "capacitive image" or points along one or more capacitive profiles (e.g., projections).

In various embodiments, transcapacitive profiles along the sensor electrodes 222 and 224 may be formed by summing the measurements of the change in capacitive coupling along each sensor electrode 222 and 224. The summed measurement of the change in capacitive coupling along each sensor electrodes forms a point along each corresponding transcapacitive profile. Further, an absolute capacitive profile along the sensor electrodes 222 may be formed based on the measurements of change in capacitive coupling between the sensor electrodes 222 and the input object 140 and an absolute capacitive profile along the sensor electrodes 224 may be formed based on the measurements of change in capacitive coupling between the sensor electrodes 224 and the input object 140.

The sensor electrodes 220 may be operated for capacitive sensing during a capacitive frame. For example, during a capacitive frame the sensor electrodes 220 may be operated for transcapacitive sensing and/or absolute capacitive sensing to determine the positional information of one or more input objects.

Figure 3A:
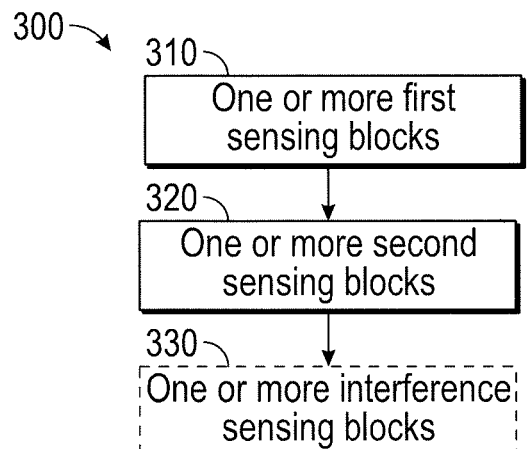
FIGS. 3A and 3B illustrate example capacitive frames, according to one or more embodiments.

In various embodiments, a capacitive frame may include one or more sensing blocks. FIG. 3A illustrates an example capacitive frame 300, according to one or more embodiments. As illustrated in FIG. 3A, the capacitive frame 300 may include one or more first sensing blocks 310, and one or more second sensing blocks 320. Further, the capacitive frame 300 may include one or more optional interference sensing blocks 330. In one embodiment, during the one or more first sensing blocks 310, transcapacitive sensing is performed. For example, one or more sensor electrodes 220 are operated as transmitter electrodes and one or more sensor electrodes 220 are operated as receiver electrodes. In one embodiment, one or more sensor electrodes 224 may be operated as transmitter electrodes and one or more of the sensor electrodes 222 may be operated as receiver electrodes, and/or one or more sensor electrodes 222 may be operated as transmitter electrodes and one or more of the sensor electrodes 224 may be operated as receiver electrodes. Further, in one or more embodiments, a first one or more of the sensor electrodes 224 may be operated as transmitter electrodes and a second one or more of the sensor electrodes 224 may be operated as receiver electrodes. Further, a third one or more of the sensor electrodes 224 may be driven with a substantially constant voltage, e.g., a system ground, or any other substantially constant voltage, or electrically floated. In other embodiments, a first one or more of the sensor electrodes 222 may be operated as transmitter electrodes and a second one or more of the sensor electrodes 222 may be operated as receiver electrodes. Further, a third one or more of the sensor electrodes 222 may be driven with a substantially constant voltage, e.g., a system ground, or any other substantially constant voltage, or electrically floated.

During each of the one or more second sensing blocks 320 one or more of the sensor electrodes 222 and/or the sensor electrodes 224 are operated for absolute capacitive sensing. In one embodiment, one or more of the sensor electrodes 222 are operated for absolute capacitive sensing and one or more of the sensor electrodes 224 are driven with a guard signal during a first period. Further, during a second period, one or more of the sensor electrodes 224 are operated for absolute capacitive sensing and one or more of the sensor electrodes 222 are driven with a guard signal.

In one or more embodiments, during the one or more second sensing blocks 320, two or more of the sensor electrodes 220 may be coupled to a common receiver of the receiver circuitry of the sensor module 210 and operated for absolute capacitive sensing. In some embodiments, for example, two or more of the sensor electrodes 222 or two or more of the sensor electrodes 224 may be coupled to a common receiver of the receiver circuitry of the sensor module 210 and operated for absolute capacitive sensing. In such an embodiment, the resulting signal received by the receiver is a combination of the sensor data corresponding to each sensor electrode coupled to the receiver.

In one embodiment, during the one or more second sensing blocks 320, two or more of the sensor electrodes 224 are operated as transmitter electrodes and two or more of the sensor electrodes 222 are operated as receiver electrodes. The two or more of the sensor electrodes 224 operated as transmitter electrodes are simultaneously driven with the same transcapacitive sensing signal such that the two or more of the sensor electrodes 224 operate as one larger transmitter electrode. In one embodiment, a first two or more of the sensor electrodes 224 are simultaneously driven with a common transcapacitive sensing signal during a first period and a second two or more of the sensor electrodes 224 are simultaneously driven with a common transcapacitive sensing signal during a second period that is non-overlapping with the first period. In one embodiment, all of the sensor electrodes 224 may be simultaneously driven with a common transcapacitive sensing signal during the one or more sensing blocks 320.

Further, in one or more embodiments, during the one or more second sensing blocks 320, two or more of the sensor electrodes 222 are operated as transmitter electrodes and two or more of the sensor electrodes 224 are operated as receiver electrodes. The two or more of the sensor electrodes 222 operated as transmitter electrodes may be simultaneously driven with the same transcapacitive sensing signal such that the two or more of the sensor electrodes 222 operate as one larger transmitter electrode. In one embodiment, a first two or more of the sensor electrodes 222 are simultaneously driven with a common transcapacitive sensing signal during a first period and a second two or more of the sensor electrodes 222 are simultaneously driven with a common transcapacitive sensing signal during a second period that is non-overlapping with the first period. In one embodiment, each of the sensor electrodes 222 may be simultaneously driven with a common transcapacitive sensing signal during the one or more sensing blocks 320.

Further, in one or more embodiments, the capacitive frame 300 includes an optional one or more interference sensing blocks. However, in various embodiments, the capacitive frame 300 may omit the one or more interference sensing blocks 330. Further, in some embodiments, a first capacitive frame may include the one or more interference sensing blocks 330 and a second capacitive frame may omit the one or more interference sensing blocks 330. During the one or more interference sensing blocks, one or more of the sensor electrodes 222 and/or the sensor electrodes 224 may be operated for interference sensing. For example, one or more of the sensor electrodes 222 and/or the sensor electrodes 224 may receive resulting signals while the sensor electrodes 222 and the sensor electrodes 224 are not driven with transcapacitive sensing signals and/or absolute capacitive sensing signals. The resulting signals received during the interference sensing blocks include information corresponding to interference and is substantially free from any information corresponding to a change in absolute capacitive coupling or a change in transcapacitive coupling. In one embodiment, each of the sensor electrodes 220 may be operated to detect interference simultaneously during a common sensing block of the one or more interference sensing blocks 330. Alternatively, each of the sensor electrodes 222 may be operated to detect interference simultaneously during a first interference sensing block of the one or more interference sensing blocks 330 and each of the sensor electrodes 224 may be operated to detect interference simultaneously during a second interference sensing block of the one or more interference sensing blocks 330.

In various embodiments, the order in which the one or more first sensing blocks 310, the one or more second sensing blocks 320, and the one or more interference sensing block 330 occur with the capacitive frame 300 may vary. For example, in one embodiment, the one or more first sensing blocks 310 may occur before the one or more second sensing blocks 320 which may occur before or after the one or more interference sensing blocks 330. In another embodiment, the one or more second sensing blocks 320 may occur before the one or more first sensing blocks 310 which may occur before or after the one or more interference sensing blocks 330 within the capacitive frame 300. Further, in one embodiment, the one or more interference sensing blocks 330 may occur before the one or more first sensing blocks 310 which may occur before or after the one or more second sensing blocks 320 within the capacitive frame 300.

Figure 3B:
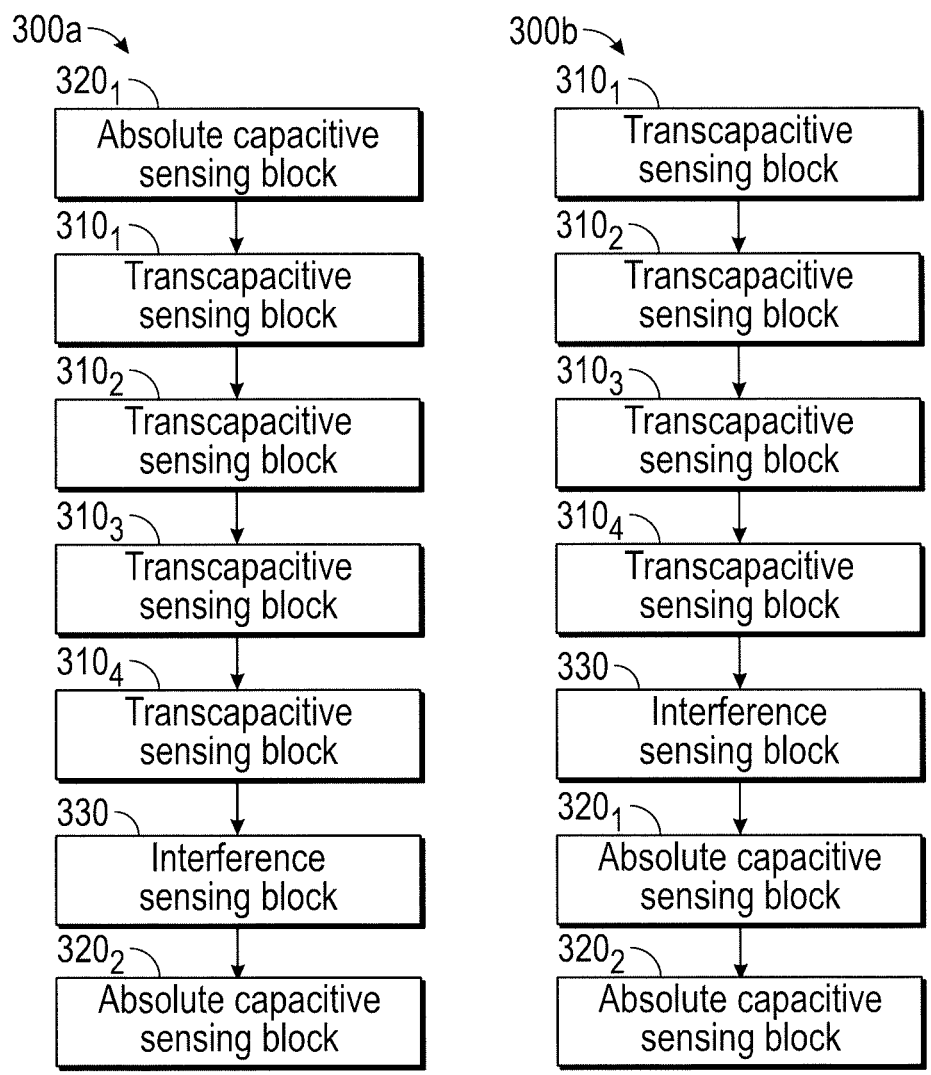
Figure 4:
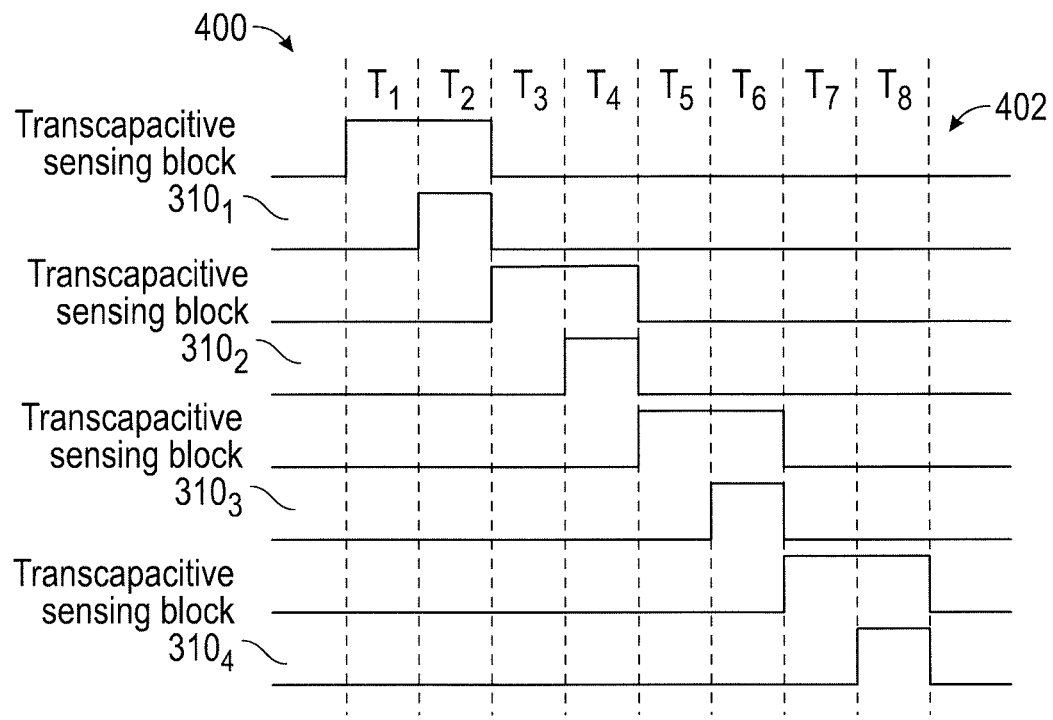
FIG. 4 illustrate signal traces, according to one or more embodiments.

FIG. 3B illustrates two capacitive frames 300a and 300b, according to one or more embodiments. Each of the capacitive frames 300a and 300b includes four transcapacitive sensing blocks $310_1$-$310_4$. However, in other embodiments, the capacitive frames 300a and 300b may include more than four transcapacitive sensing blocks or less than four transcapacitive sensing blocks. Further, each of the capacitive frames 300a and 300b includes an interference sensing block 330. While one interference sensing block 330 is shown in FIG. 4, in other embodiments, the capacitive frames 300a and 300b may include more than one interference sensing block 330 or may omit the interference sensing block 330. Further, each of the capacitive frames 300a and 300b may also include at least two absolute capacitive sensing blocks $320_1$, $320_2$.

As shown in the capacitive frame 300a, the absolute capacitive sensing block $320_1$ may occur before each of the transcapacitive sensing blocks 310, and the interference sensing block 330 and the absolute capacitive sensing block $320_2$ may occur after the last transcapacitive sensing block 310. In one embodiment, the interference sensing block 330 occurs after the last transcapacitive sensing block 310 and the absolute capacitive sensing block $320_2$ occurs after the interference sensing block 330. Alternatively, the absolute capacitive sensing block $320_2$ occurs after the last transcapacitive sensing block 310 and the interference sensing block 330 occurs after the absolute capacitive sensing block $320_2$. In one embodiment, the interference sensing block 330 occurs after the absolute capacitive sensing block $320_1$ and before the transcapacitive sensing blocks 310. Further, the transcapacitive sensing blocks 310 may be completed without interruption by any other types of sensing blocks (e.g., absolute capacitive sensing blocks and/or interference sensing blocks).

As shown in the capacitive frame 300b, the transcapacitive sensing blocks 310 occur before the interference sensing block 330 and before the absolute capacitive sensing block $320_1$ and the absolute capacitive sensing block $320_2$. The interference sensing block 330 may occur after the last transcapacitive sensing block 310 and before the absolute capacitive sensing blocks $320_1$, $320_2$, between the absolute capacitive sensing blocks $320_1$, $320_2$, or after the absolute capacitive sensing blocks $320_1$, $320_2$.

In one or more embodiments, the number of transcapacitive sensing blocks 310 may correspond to the total number of sensor electrodes divided by the number of sensor electrodes operated as transmitter electrodes during each transcapacitive sensing block (e.g., the code length). For example, the sensor electrodes 222 include eight sensor electrodes, and driving two sensor electrodes per sensing block provides four transcapacitive sensing blocks.

In one or more embodiments, in the capacitive frame 300a, during a first transcapacitive sensing block $310_1$, first and second ones of the sensor electrodes 222 are driven with the transcapacitive sensing signals based on one or more codes. The first transcapacitive sensing block corresponds to time periods $T_1$ and $T_2$. Further, the driven electrodes corresponding to a high voltage of the traces. During a second transcapacitive sensing block $310_2$, third and fourth ones of the sensor electrodes 222 are driven with the transcapacitive sensing signals based on the codes. The second transcapacitive sensing block corresponds to time periods $T_3$ and $T_4$. During a third transcapacitive sensing block $310_3$, fifth and sixth ones of the sensor electrodes 222 are driven with the transcapacitive sensing signals based on the codes. The third transcapacitive sensing block corresponds to time periods $T_5$ and $T_6$. During a fourth transcapacitive sensing block $310_3$, seventh and eighth ones of the sensor electrodes 222 are driven with the transcapacitive sensing signals based on the codes. The fourth transcapacitive sensing block corresponds to time periods $T_7$ and $T_8$. In various embodiments, during the first transcapacitive sensing block $310_1$, the sensor electrodes not driven (e.g., identified as a low voltage of the traces) with the transcapacitive sensing signals may be driven with a substantially constant signal (e.g., ground or any none varying voltage signal) or electrically floated. Further, during each of the time periods $T_1$-$T_8$, the sensor electrodes 224 may be operated as receiver electrodes to receive resulting signals. In one embodiment, the sensor electrodes 224 are driven with the transcapacitive sensing signals as described above and the sensor electrodes 222 are operated as receiver electrodes as described above.

During each of the one or more absolute capacitive sensing blocks $320_1$, $320_2$, one or more of the sensor electrodes 222 and/or the sensor electrodes 224 may be operated as absolute capacitive sensor electrodes by simultaneously driving the sensor electrodes with an absolute capacitive sensing signals and receiving a resulting signal from the driven sensor electrodes. For example, during the absolute capacitive sensing block $320_1$, each of the sensor electrodes 222 may be simultaneously operated as absolute capacitive sensor electrodes. Further, during the absolute capacitive sensing block $320_2$, each of the sensor electrodes 224 may be simultaneously operated as absolute capacitive sensor electrodes. Alternatively, the sensor electrodes 224 may be operated as absolute capacitive sensor electrodes during the absolute capacitive sensing block $320_1$ and the sensor electrodes 222 may be operated as absolute capacitive sensor electrodes during absolute capacitive sensing block $320_2$. In one embodiment, during a first absolute capacitive sensing block (e.g., the absolute capacitive sensing block $320_1$ or $320_2$), each of the sensor electrodes 222 and the sensor electrodes 224 are simultaneously operated as absolute capacitive sensor electrodes. Further, in one or more embodiments, the one or more absolute capacitive sensing blocks $320_1$, $320_2$ may include more than two sensing blocks, and during each sensing block, any number of sensor electrodes 222 and/or sensor electrodes 224 may be operated as absolute capacitive sensor electrodes.

In one embodiment, a capacitive frame rate (or sensing rate) corresponds to how often a capacitive frame, e.g., the capacitive frame 300, is completed. For example, a capacitive frame may be acquired once every 16 ms, generating a capacitive frame rate of 60 Hz. In other embodiments, the capacitive frame rate may be about 90 Hz, 120 Hz, 240 Hz, or greater. Further, in one or more embodiment, the capacitive frame rate may be less than 60 Hz (e.g. for low power sensing).

Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region, or alternately report an input object hovering (e.g., proximate to, but not in contact with an input surface of the input device 100), touching (e.g., in contact with an input surface of the input device 100), pressing on the input surface of the input device or lifting from a the input surface of the input device 100 for various GUI implementations.

In one or more embodiments, capacitive sensing (or input sensing) and display updating may occur during at least partially overlapping periods. For example, as a display panel is driven for display updating, the sensor electrodes 220 may also be driven for capacitive sensing. In another embodiment, capacitive sensing and display updating may occur during non-overlapping periods, also referred to as non-display update periods. In one such embodiment, the non-display update periods may be a blanking period between the last line of a display frame and the first line of the following display frame (e.g. during a vertical blanking period). In various embodiments, the non-display update periods may occur between display line update periods for two consecutive display lines of a display frame and may be at least as long in time as the display line update period. In such embodiments, a non-display update period may be referred to as a long horizontal blanking period, long h-blanking period or a distributed blanking period, where the blanking period occurs between two display updating periods within a display frame and is at least as long as a display line update period. In one embodiment, the non-display update period occurs between display line update periods of a display frame and is long enough to allow for multiple transitions of the transcapacitive sensing signal or absolute capacitive sensing signal to be driven onto the sensor electrodes to be sampled and filtered. In other embodiments, the non-display update period may comprise horizontal blanking periods and vertical blanking periods. Further, the combination of horizontal blanking periods and vertical blanking periods present in the non-display update period or periods may depend on the a selected interference level and selected report rate for the measurement. Further, the types of input sensing performed may be used to determine the combination of horizontal blanking periods and vertical blanking periods present in the non-display update period or periods. For example, hover sensing may be performed between display frames and touch detection may be performed during display frames.

FIG. 4 illustrates signal traces of signals that may be used for transcapacitive sensing, according to one or more embodiments. In one embodiment, the timing diagram 400 illustrates codes 402 for generating transcapacitive sensing signals that may be driven on the sensor electrodes 220 to perform transcapacitive sensing during one or more of the transcapacitive sensing blocks $310_1$, $310_2$, $310_3$, and $301_4$. In one embodiment, the transcapacitive sensing signals are generated based on different ones of a plurality of at least substantially orthogonal codes. For example, the transcapacitive sensing signals are based on the code 402 having coefficients of (1, 1) or (-1, 1). However, in other embodiments, other codes may be utilized. For example, different types of coding technique may be utilized to generate the transcapacitive sensing signals as long as the codes provide independent measurements. In one or more embodiments, codes may be used such that the individual capacitive measurements between each of the sensor electrodes 220 may be determined by demodulating the resulting signals based on the codes used to generate the transcapacitive sensing signals. In various embodiments, the code length may correspond to the number of sensor electrodes that are simultaneously driven. For example, in the embodiment of FIG. 4 the code length is two. However, in other embodiments, the code length of the code utilized to generate the transcapacitive sensing signals may be greater than two. In one embodiment, generating the transcapacitive sensing signals based on codes may be referred to as performing code division multiplexing (CDM). Further, a code length of two may be referred to as CDM2, a code length of four ay be referred to as CDM4 and a code length of N may be referred to as CDMN.

Figure 5:
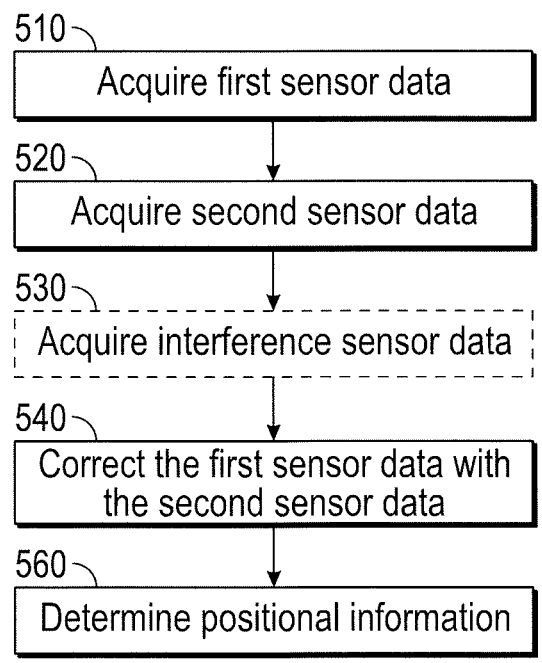
FIGS. 5, 6, and 7 are flow diagrams of methods for performing capacitive sensing, according to one or more embodiments.

FIG. 5 illustrates a flowchart of a method 500 of operating an input device (e.g., input device), according to one or more embodiments. At operation 510, first sensor data is acquired. The first sensor data may correspond to transcapacitive sensor data. For example, the transcapacitive sensor data may be acquired by operating the sensor electrodes 220 for transcapacitive sensing during one or more transcapacitive sensing blocks 310.

In one embodiment, during a first transcapacitive sensing block (e.g., the transcapacitive sensing block $310_1$), a first one or more of the sensor electrodes 222 are driven with transcapacitive sensing signals and the sensor electrodes 224 are operated as receiver electrodes. During a second transcapacitive sensing block (e.g., the transcapacitive sensing block $310_2$), a second one or more of the sensor electrodes 222 are driven with transcapacitive sensing signals and the sensor electrodes 224 are operated as receiver electrodes. This process may be repeated until each of the sensor electrodes 222 are driven with transcapacitive sensing signals during a transcapacitive sensing block 310. In the above embodiment, one or more of the sensor electrodes 224 may be driven with transcapacitive sensing signals instead of driving one or more of the sensor electrodes 222 with transcapacitive sensing signals and one or more of the sensor electrodes 222 may be operated as receiver electrodes instead of operating one or more of the sensor electrodes 224 as receiver electrodes.

At operation 520, second sensor data is acquired. For example, in one embodiment absolute capacitive sensor data is acquired during an absolute capacitive sensing block, e.g., the absolute capacitive sensing block 320. For example, the sensor module 210 may acquire the absolute capacitive sensor data from the sensor electrodes 220 by modulating the sensor electrodes 220 with absolute capacitive sensor signals while receiving resulting signals from the driven sensor electrodes.

In another embodiment, at operation 520 the second sensor data is acquired by receiving sensor data simultaneously from two or more of the sensor electrodes 220. For example, two or more of the sensor electrodes 220 may be coupled to a common receiver of the sensor module 210, and sensor data is acquired simultaneously from the two or more sensor electrodes 220. In one embodiment, a receiver of the sensor module 210 may be coupled to two or more of the sensor electrodes 222 and/or 224 and may operate the two or more sensor electrodes 222 and/or 224 for absolute capacitive sensing. The sensor data received from the two or more sensor electrodes 222 and/or 224 is a combination of sensor data received from the two or more sensor electrodes 222 and/or 224.

In one or more embodiments, during operation 520 the sensor module 210 drives two or more of the sensor electrodes 224 with a common transcapacitive sensing signal and receives resulting signals from two or more of the sensor electrodes 222. The two or more of the sensor electrodes 222 may be coupled to a common receiver of the sensor module 210, and a combined resulting signal is received from all of the sensor electrodes 222. Further, in one embodiment, the sensor module 210 drives a first two or more of the sensor electrodes 224 with a common transcapacitive sensing signal and receives one or more resulting signals from the sensor electrodes 222 during a first period and drives a second two or more of the sensor electrodes 224 with a common transcapacitive sensing signal and receives one or more resulting signals from the sensor electrodes 222 during a second period. Further, in one embodiment, the sensor module 210 drives each of the sensor electrodes 224 with a common transmitter signal and receives a combined resulting signal from each of the sensor electrodes 222. In other embodiments, the sensor electrodes 222 may be operated as receiver electrodes and the sensor electrodes 224 may be operated as transmitter electrodes.

In other embodiments, during operation 520 the sensor module 210 is configured to receive second sensor data by driving a first one of the sensor electrodes 224 with a transcapacitive sensing signal and receiving a resulting signal from a second one of the sensor electrodes 224. Further, the sensor module 210 may drive one or more of the sensor electrodes 224 with a substantially constant voltage or electrically float one or more of the sensor electrodes 224. The one or more sensor electrodes 224 are positioned between the first one of the sensor electrodes 224 and the second one of the sensor electrodes 224.

At operation 530, interference sensor data is acquired. For example, the sensor module 210 may acquire interference sensor data from the sensor electrodes 220 by receiving resulting signals from sensor electrodes 220 while the sensor electrodes 220 are not operated for capacitive sensing.

In one embodiment, the operation 520 may occur before or after the operation 510. Further, the operation 530 may occur before or after the operation 510 and 520. In one embodiment, the operation 530 is optional and may be omitted.

At operation 540, the first sensor data is adjusted using the second sensor data. In one or more embodiments, the determination module 212 may generate first profiles from the first sensor data and second profiles from the second sensor data. Further, the determination module 212 may compare the first profiles with the second profiles to determine differences between the first and second profiles and use those differences to adjust the first sensor data. For example, the determination module 212 may generate a correction value based on the difference between the first and second profiles and adjust the first sensor data based on the correction value. For example, one or more values of the first sensor data may be increased or decreased based on the correction value. Further, the determination module 212 may increase or decrease the amplitude of the first profile, increase or decrease the width of the first profile, and/or adjust the first profile based on a weight to correct the first sensor data based on the difference between the first profile and the second profile. Additional methods for adjusting the first sensor data with the second sensor data are described in FIGS. 6, 7, and 10, and the corresponding description.

In one embodiment, the determination module 212 may generate a first transcapacitive profile along the sensor electrodes 224 and/or a second transcapacitive profile along the sensor electrodes 222 from the resulting signals received during operation 510. In one embodiment, the determination module 212 determines a plurality of transcapacitive measurements corresponding to the changes in capacitive coupling between the sensor electrodes 224 and 222 from the first sensor data. Further, the determination module 212 may generate the transcapacitive profiles by combining the transcapacitive measurements along each sensor electrode 224 and by combining the transcapacitive measurements along each sensor electrode 222. Each of the sensor electrodes 222 and 224 may correspond to point along the corresponding transcapacitive profile. Further, the determination module 212 may generate absolute capacitive profiles from the sensor data acquired during the operation 520. For example, a first absolute capacitive profile may be generated from the sensor data or corresponding resulting signals received from the sensor electrodes 222 and a second absolute capacitive profile may be generated by the sensor data or corresponding resulting signals received from the sensor electrodes 224.

In one embodiment, the determination module 212 may compare transcapacitive profiles with the absolute capacitive profiles to correct the transcapacitive sensor data. For example, the determination module 212 may determine a difference between a transcapacitive profile and a corresponding absolute capacitive profile. The transcapacitive profile and the corresponding absolute capacitive profile may be formed along the sensor electrodes 224 or the sensor electrodes 222. In one embodiment, the determination module 212 may alter, or adjust, the transcapacitive profile based on the difference between the transcapacitive profile and the corresponding absolute capacitive profile. For example, the determination module 212 may increase or decrease the amplitude of the transcapacitive profile, increase or decrease the width of the transcapacitive profile, and/or adjust the transcapacitive profile based on a weighting function.

In one or more embodiments, adjusting the first sensor data using the second sensor data may comprise determining whether or not an input object 140 entered the sensing region 120 during operation 510. For example, in one embodiment, the determination module 512 uses the sensor data acquired during the operation 520 to determine the presence of an input object 140 and if an input object 140 is detected as being present during the operation 510, the current capacitive frame may be ignored and a new capacitive frame may be acquired.

At operation 560, positional information is determined. For example, the sensor module 210 may communicate the transcapacitive sensor data, the absolute capacitive sensor data and the interference sensor data to the determination module 212, and the determination module 212 may determine positional information for one or more input objects (e.g., the input object 140). In one embodiment, the determination module 212 may determine a capacitive image from the transcapacitive sensor data. For example, a measurement of a change in transcapacitance between sensor electrodes 220 is determined and utilized to generate a capacitive image. Further, the determination module 212 may determine a transcapacitive profile along the sensor electrodes 222 by combining the measurements of change in transcapacitance along each sensor electrode 222 and a transcapacitive profile along the sensor electrodes 224 by combining the measurements of change in transcapacitance along each sensor electrode 224.

Further, the determination module 212 may determine a measurement of a change in absolute capacitance for each sensor electrode 222 and each sensor electrode 224. In one embodiment, a profile may be determined along each sensor electrode 222 and an absolute capacitive profile along each sensor electrode 224 based on the measurements of change in absolute capacitance for each corresponding sensor electrode.

In one embodiment, the determination module 212 determines a measurement of interference from the interference sensor data. For example, the determination module may determine an interference image and/or one or more interference profiles. The determination module 212 may compare the interference image with the capacitive image to remove interference from the capacitive image, generating an adjusted capacitive image. Further, the determination module 212 may compare the interference profiles with the absolute capacitive profiles to generate adjusted absolute capacitive profiles. The determination module 212 may compare and/or combine the adjusted capacitive image with the adjusted absolute capacitive profiles to determine the positional information of the input object 140. For example, the absolute capacitive profiles may be utilized to confirm the positional information of the input object determined from the adjusted capacitive image.

In one embodiment, the determination module 212 compares the first sensor data, the second sensor data, and/or the corrected first sensor data to a detection threshold to determine the presence of one or more input objects (e.g., input objects 140). In one embodiment, when the sensor data is greater than or equal to the detection thresholds, the presence of an input object (e.g., the input object 150) is determined. In various embodiments, when operating in a low power mode, two or more sensing blocks (e.g., one or more transcapacitive sensing blocks 310 and/or one or more absolute capacitive sensing blocks 320) may be utilized to determine the presence of an input object. Further, to aid in detection, the detection threshold may be reduced, such that sensor data corresponding to smaller changes in capacitive coupling may identify an input object.

Figure 6:
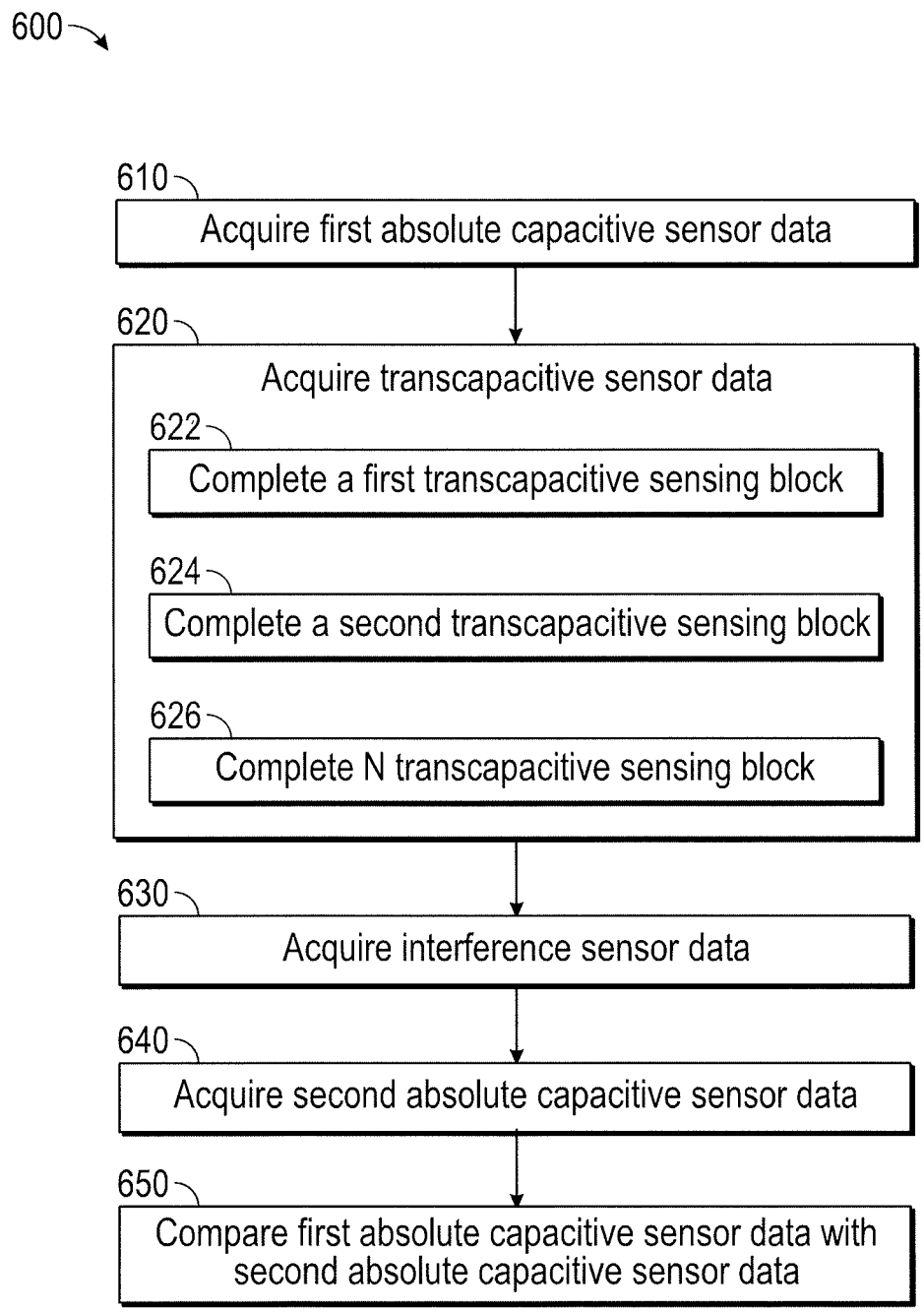

FIG. 6 illustrates a flow chart of a method 600 for acquiring sensor data during a capacitive frame, according to one or more embodiments. At operation 610, first absolute capacitive sensor data is acquired. For example, the sensor module 210 may acquire first absolute capacitive sensor data by operating first one of the sensor electrodes 222 and the sensor electrodes 224 for absolute capacitive sensing during a first absolute capacitive sensing block, e.g., the absolute capacitive sensing block $320_1$.

At operation 620, transcapacitive sensor data is acquired. For example, a first one or more of the sensor electrodes 220 may be operated as transmitter electrodes and a second one or more of sensor electrodes 220 may be operated as receiver electrodes to acquire the transcapacitive sensor data during one or more transcapacitive sensing blocks 310. In one embodiment, acquiring the transcapacitive sensor data includes: operation 622, completing a first transcapacitive sensing block, e.g., the transcapacitive sensing block $310_1$; operation 624, completing a second sensing block, e.g., the transcapacitive sensing block $310_2$; and operation 626 completing an N transcapacitive sensing block, where N is any integer greater than 2. In one embodiment, the operation 620 may occur after the completion of the operation 610.

At operation 630, interference sensor data is acquired. For example, the sensor module 210 may acquire interference sensor data from the sensor electrodes 222 and/or 224 during the interference sensing block 330. In one embodiment, the operation 630 may occur after the completion of the operation 620.

At operation 640, second absolute capacitive sensor data is acquired. For example, the sensor module 210 may be configured to acquire second absolute capacitive sensor data during the absolute capacitive sensing block $320_2$ by operating one of the sensor electrodes 222 and the sensor electrodes 224 for absolute capacitive sensing that were not operated for absolute capacitive sensing during operation 610. In one embodiment, the operation 640 may occur after the completion of the operation 630.

At operation 650, the first absolute capacitive sensor data is compared with the second absolute capacitive sensor data. For example, the determination module 212 may receive the first and second absolute capacitive sensor data from the sensor module 210 and compare the first absolute capacitive sensor data with the second absolute capacitive sensor data. In one embodiment, comparing the first absolute capacitive sensor data with the second absolute capacitive sensor data comprises generating a first absolute capacitive profile and a second absolute capacitive profile from the first and second absolute capacitive sensor data, respectively, and comparing the first absolute capacitive profile with the second absolute capacitive profile.

In one embodiment, the determination module 212 may be configured to detect an input object, e.g., the input object 140, which enters the sensing region 120 during the capacitive frame, or leaves the sensing region 120 during the capacitive frame by comparing the first absolute capacitive sensor data with the second absolute capacitive sensor data. In various embodiments, any differences between the sensor data (or profiles) may indicate that an input object, e.g., the input object 140, entered within the sensing region 120 during acquisition of the transcapacitive sensor data or that an input object, e.g., the input object 140 was removed from the sensing region 120 during acquisition of the transcapacitive sensor data. In one embodiment, any differences between the sensor data (or profiles) may indicate that an input object entered a contact portion of the sensing region 120 during acquisition of the transcapacitive sensor data or that an input object, e.g., the input object 140, was removed from the contact portion of the sensing region 120 during acquisition of the transcapacitive sensor data. The contact portion of the sensing region 120 may correspond to a region of the sensing region 120 that includes at least an input surface of the input device 100 and may extend to a hover portion of the sensing region 120. In one embodiment, thresholds may be utilized to determine if an input object is in the contact portion or the hover portion of the sensing region. For example, a contact threshold may be utilized to determine whether or not an input object is within the contact portion and at least the hover threshold may be utilized to determine if an input object is in the hover region. In one embodiment, measurements of changes in capacitance are compared to the contact threshold and the hover threshold to determine the location of an input object. If the measurements satisfy the contact threshold, the input object 140 may be determined to be in the contact region. Alternatively, if the measurements do not satisfy the contact threshold, the measurements may be compared to hover threshold to determine if the measurements satisfy the hover threshold. If the measurements are found to satisfy the hover threshold, the input object 140 may be determined to be in the hover portion of the sensing region 120. Further, if the measurements do not satisfy the contact threshold and the hover threshold, a lack of an input object within the sensing region 120 may be determined. In one or more embodiments, the value or values of the hover threshold differ from the value or values of the contact threshold (e.g., greater than or less than). In various embodiments, an input object entering the sensing region 120 may be referred to as a land event and an input object leaving the sensing region 120 may be referred to as a lift event.

In one embodiment, a capacitive sum may be determined per axis of the sensor electrodes 220, e.g., along each of the sensor electrodes 222 and the sensor electrodes 224, to detect land and lift events. For example, the sum along each axis may be determined by equation 1.

$$S_{TX} = \sum_{i \in TX} P_i^{TX} \Theta(P_i^{TX} - n^{TX}) \qquad (1)$$

-continued $$S_{RX} = \sum_{i \in RX} P_i^{RX} \Theta(P_i^{RX} - n^{RX})$$

In equation 1, $P_i^A$ is the profile delta measurement, $\Theta$ is the Heaviside step function to apply a threshold, and n' is the threshold. Further, $S_{Tx}$ may correspond to the total capacitance along sensor electrodes 222 and $S_{Rx}$ may correspond to the total capacitance along sensor electrodes 224. Alternatively, $S_{Tx}$ may correspond to the total capacitance along sensor electrodes 224 and $S_{Rx}$ may correspond to the total capacitance along sensor electrodes 222. The threshold may be utilized to minimize any contribution of interference. In one embodiment, as the acquisition of the absolute capacitive sensor data of operations 610 and 640 is separated by the acquisition of the transcapacitive sensor data of operation 620, a substantially constant ratio between the capacitance sums as determined from equation 1 may indicate that the input object 140 remained within the sensing region 120 during acquisition of the transcapacitive sensor data or may indicate that the input object 140 remained outside the sensing region 129 during acquisition of the transcapacitive sensor data. In one embodiment, a constant ratio may correspond to $S_{TX}=\alpha S_{Rx}$, where a is a measurable constant. For example, a may correspond to a difference in absolute capacitance between the sensor electrodes 222 and the sensor electrodes 224 due to differences in size, shape, RC time constants and/or distances between the sensor electrodes 222 and 224 and an input surface of the input device 100. A difference in $S_{TX}$ and $S_{Rx}$ may be indicative of a either an input object entering a sensing region or leaving a sensing. For example, a difference in $S_{TX}$ and $S_{RX}$ beyond a may be indicative of an input object leaving at least a contact region or entering a contact region of a input device, e.g., the input device 100.

In one embodiment, the determination module 212 may be configured to apply one or more filtering techniques to the transcapacitive sensor data in response to a detection of lift event or a land event during acquisition of the transcapacitive sensor data. Further, the one or more filters applied to the transcapacitive sensor data may be adjusted in response to detection of a lift or land event. For example, the parameters of a land filter, a lift filter, and/or a jitter filter may be adjusted in response to the detection of a lift or land event. A land filter may be utilized to detect land events during acquisition of sensor data, a lift filter may be utilized to detect lift events during acquisition of sensor data, and a jitter filter may be utilized to remove small variations in position of the input object 140 during a capacitive frame. Adjusting the parameters of one or more of the land filter, the lift filter and the jitter filter may comprise instructing the filter that one or more of a lift and land event occurred while the transcapacitive sensor data was acquired and adjusting a behavior of the filter accordingly. For example, one or more of the land filter, the lift filter and the jitter filter may be adjusted to reduce artifacts at the completion of an input gesture (e.g., a swipe gesture, scroll gesture, pinch gesture, and a rotate gesture, among others). In one embodiment, the determination module 212 is configured to adjust an absolute/transcapacitive delta correction algorithm. The absolute/transcapacitive delta correction algorithm corresponds to the degree of match between absolute capacitive profiles and transcapacitive profiles. Adjusting the absolute/transcapacitive delta correction algorithm may include the attenuation of a correction strength applied to the transcapacitive sensor data, and/or preventing any capacitive pixels from incorrectly changing from a negative value to a positive value or a positive value to a negative value.

In one embodiment, transcapacitive sensor data may be ignored when a lift or land event is detected during the acquisition of the transcapacitive sensor data. For example, the absolute capacitive sensor data may be utilized for input sensing instead of the transcapacitive sensor data. In various embodiment, the report latency may be lowered when a lift or land event is detected during the acquisition of the transcapacitive sensor data.

In one embodiment, the determination module 112 may be configured to drop or ignore a capacitive frame having a land event or a lift event detected during the capacitive frame. Further, in one embodiment, motion corresponding to the land event and/or the lift event may be interpolated over the acquisition of the transcapacitive sensor data to reconstruct the transcapacitive sensor data. The reconstruction may take motion of an input object in the X, Y, and Z direction relative to an input surface of the input device 100 into account.

Figure 7:
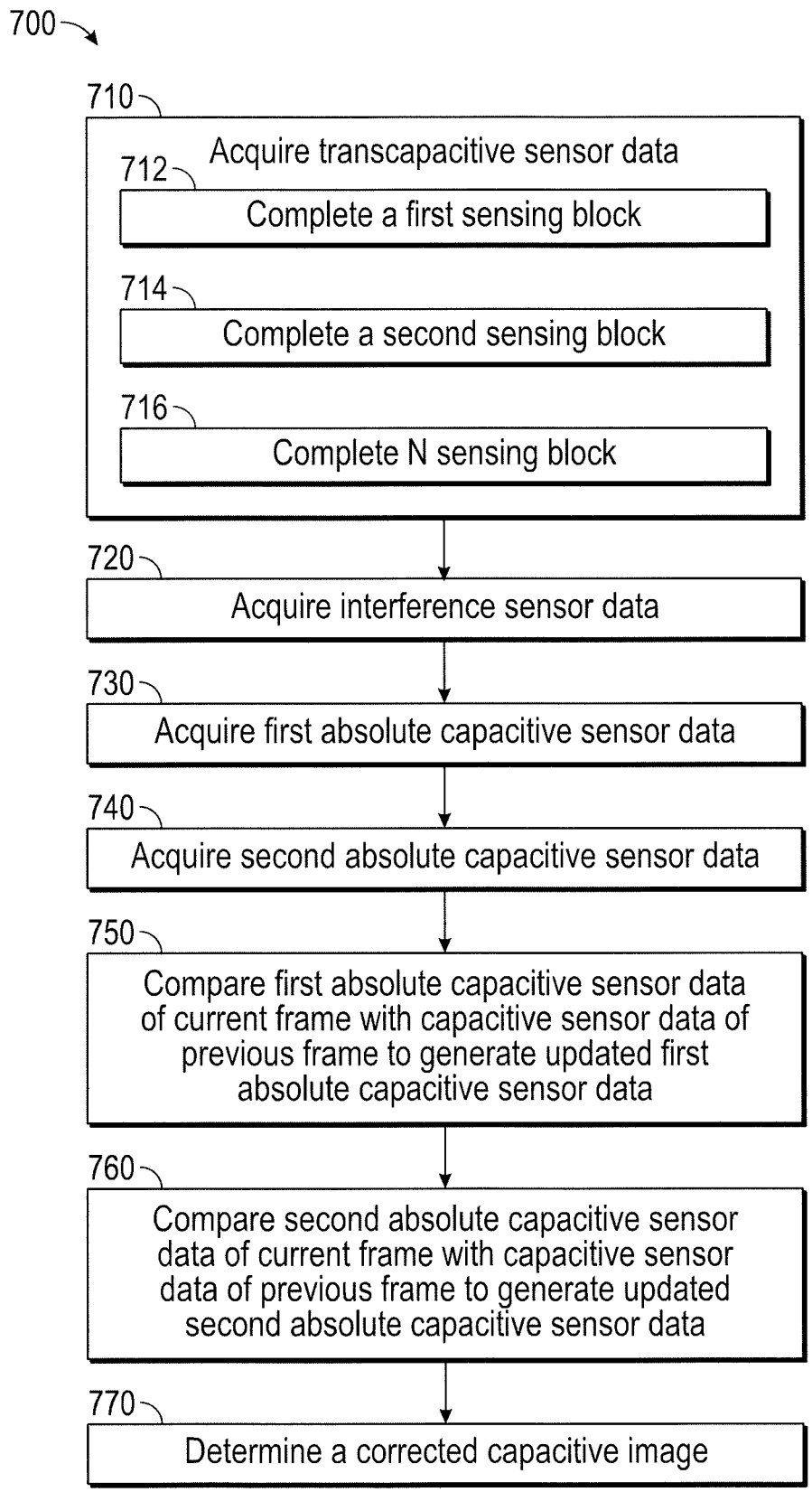

FIG. 7 illustrates a flow chart of a method 700 for acquiring sensor data during a capacitive frame, according to one or more embodiments. At operation 710, transcapacitive sensor data is acquired. For example, a first one or more of the sensor electrodes 220 may be operated as transmitter electrodes and a second one or more of the sensor electrodes 220 may be operated as receiver electrodes to acquire the transcapacitive sensor data during one or more transcapacitive sensing blocks 310. In one embodiment, acquiring the transcapacitive sensor data includes: operation 712, completing a first transcapacitive sensing block, e.g., the transcapacitive sensing block $310_1$; operation 714, completing a second sensing block, e.g., the transcapacitive sensing block $310_2$; and operation 716 completing an N sensing block, where N is any integer greater than 2.

At operation 720, interference sensor data is acquired. For example, the sensor module 210 may acquire interference sensor data from one or more the sensor electrodes 220 during an interference sensing block 330.

At operation 730, first absolute capacitive sensor data is acquired. For example, the sensor module 210 may be configured to acquire first absolute capacitive sensor data during the absolute capacitive sensing block $320_1$ by operating the sensor electrodes 222 for absolute capacitive sensing. The operation 730 may be completed after the operation 710. Further, the operation 730 may be completed after the operations 710 and 720.

At operation 740, second absolute capacitive sensor data is acquired. For example, the sensor module 210 may be configured to acquire second absolute capacitive sensor data by operating the sensor electrodes 224 during the absolute capacitive sensing block $320_2$ for absolute capacitive sensing. In one embodiment, the operation 740 may be completed after the operation 730. Alternately, the operation 740 may be completed before the operation 730. Further, in embodiments where a plurality of capacitive frames are successively acquired, for every even capacitive frame the operation 740 may be completed after the operation 730, and for every odd capacitive frame, the operation 740 may be completed before the operation 730.

At operation 750, the first absolute capacitive sensor data of the current capacitive frame is compared with the first absolute capacitive sensor data of the previous capacitive frame. The previous capacitive frame may be a capacitive frame that occurs before the current capacitive frame in time. For example, the previous capacitive frame may be the capacitive frame that immediately precedes the current capacitive frame. In one embodiment, the determination module 212 may receive the first absolute capacitive sensor data of the current capacitive frame from the sensor module 210 and compare the first absolute capacitive sensor data of the current capacitive frame to the first absolute capacitive sensor data of the previous capacitive frame to generate updated first absolute capacitive sensor data. In one embodiment, comparing the first absolute capacitive sensor data of the current capacitive frame with the first absolute capacitive sensor data of the previous capacitive frame comprises averaging the first absolute capacitive sensor data of the current capacitive frame with the first absolute capacitive sensor data of the previous capacitive frame. In other embodiments, the absolute capacitive sensor data may be combined using other methods.

In one embodiment, the determination module 212 performs a spatial Fourier transform on the first and second absolute capacitive sensor data of the current capacitive frame and the first and second absolute capacitive sensor data of the previous capacitive frame to determine a phase of the absolute capacitive sensor data. In various embodiments, the determination module 212 averages the phase of the first absolute capacitive sensor data of the current capacitive frame with the phase of the first absolute capacitive sensor data of the previous capacitive frame. Additionally, the determination module 212 may average the phase of the second absolute capacitive sensor data of the current capacitive frame with the phase of the second absolute capacitive sensor data of the previous capacitive frame.

At operation 760, the second absolute capacitive sensor data of the current capacitive frame is compared with the second absolute capacitive sensor data of the previous capacitive frame. For example, the determination module 212 may receive the second absolute capacitive sensor data of the current capacitive frame from the sensor module 210 and compare the second absolute capacitive sensor data of the current capacitive frame of the second absolute capacitive sensor data of a previous capacitive frame to generate an updated second absolute capacitive sensor data for the current frame. In one embodiment, comparing the second absolute capacitive sensor data of the current capacitive frame with the second absolute capacitive sensor data of the previous capacitive frame comprises averaging the second absolute capacitive sensor data of the current capacitive frame with the second absolute capacitive sensor data of the previous capacitive frame. In other embodiments, the sensor data may be combined using other methods. For example, the absolute capacitive sensor data may be combined by linearly interpolating between the two sets of absolute capacitive sensor data using different weighting factors per sensor electrode. The weighting factors may be a function of time delay between when the corresponding absolute capacitive data is acquired and when the corresponding transcapacitive data is acquired.

At operation 770, a corrected capacitive image is determined. For example, the determination module 212 may determine a corrected capacitive image from the updated first absolute capacitive sensor data and the updated second absolute capacitive sensor data. In one embodiment, the determination module 212 utilizes the updated first absolute capacitive sensor data and the updated second absolute capacitive sensor data to generate the capacitive image. For example, the updated first absolute capacitive sensor data and the updated second absolute capacitive sensor data may be used to adjust the transcapacitive sensor data to remove any artifacts or erroneous values within the transcapacitive sensor data. For example removing artifacts and/or erroneous values from the transcapacitive sensor data may increase the accuracy of the reported location of an input object or objects within a sensing region and decrease the possibility of false detection of an input object or objects. In one embodiment, the updated first and second absolute capacitive sensor data may be utilized to generate updated first and second absolute capacitive profiles. The updated first and second absolute capacitive profiles may be compared against transcapacitive profiles generated from the transcapacitive sensor data to determine one or more correction coefficients. The correction coefficients may be applied to the transcapacitive sensor data or the capacitive image to remove any distortions or erroneous values within the capacitive image.

In one embodiment, a capacitive frame may include four or more absolute capacitive sensing blocks 330. Further, the absolute capacitive sensor data acquired during the absolute capacitive sensing blocks may be combined to reduce artifacts within the transcapacitive sensor data. For example, during a first absolute capacitive sensing block first absolute capacitive sensor data may be acquired, during a second absolute capacitive sensing block second absolute capacitive sensor data may be acquired, during a third absolute capacitive sensing block third absolute capacitive sensor data may be acquired, and during a fourth absolute capacitive sensing block fourth absolute capacitive sensor data may be acquired. The first and third absolute capacitive sensor data may be acquired from the sensor electrodes 224, and the second and fourth absolute capacitive sensor data may be acquired from the sensor electrodes 222. The determination module 212 may be configured to combine the first and third absolute capacitive sensor data and the second and fourth absolute capacitive sensor data as is described above to generate updated first and second absolute capacitive sensor data and/or updated first and second absolute capacitive sensing profiles. The updated first and second absolute capacitive sensor data and/or updated first and second absolute capacitive sensing profiles may be utilized as is described above to generate a corrected capacitive image.

Figure 8:
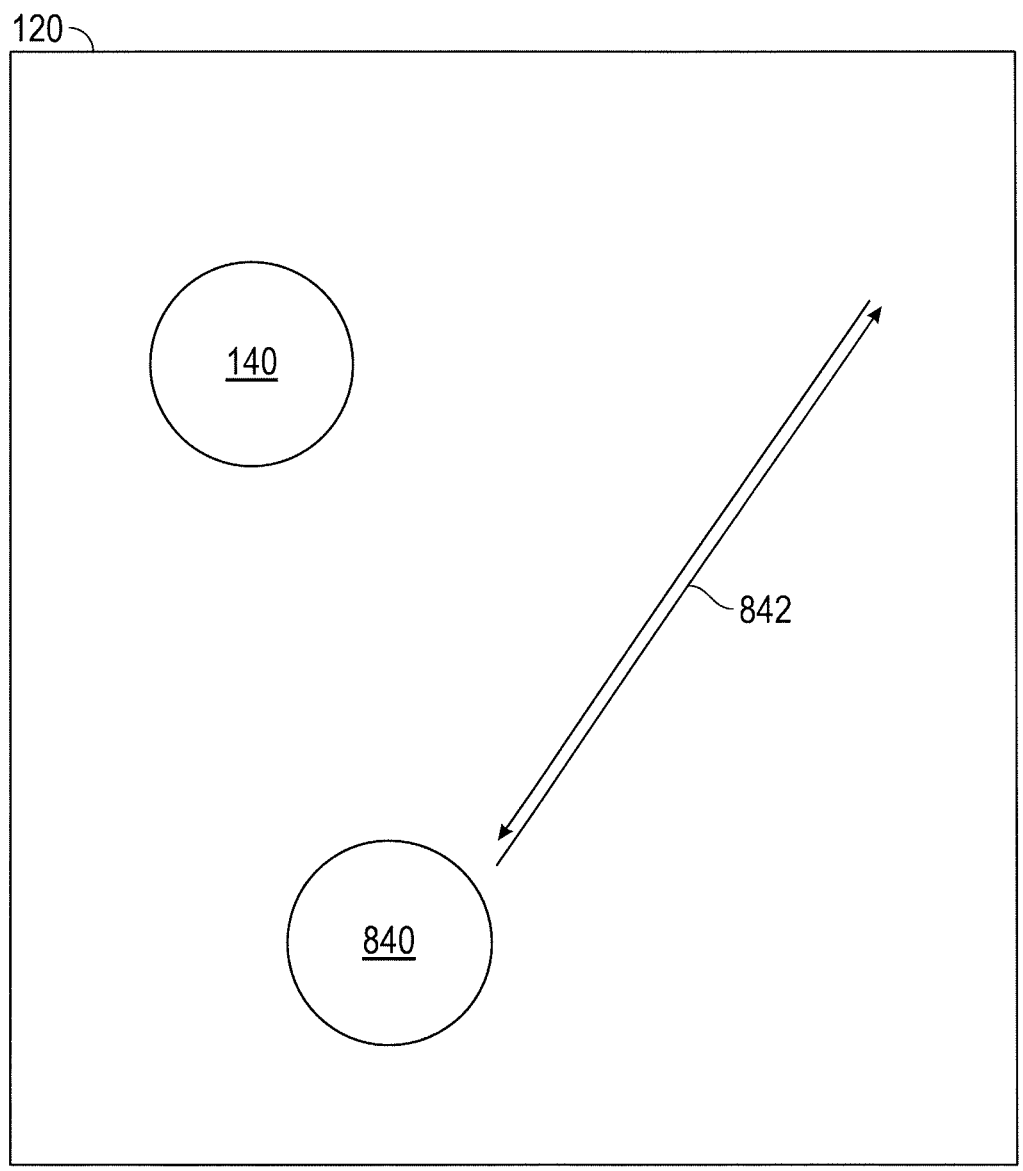
FIG. 8 illustrates an example input objects within a sensing region of an input device, according to one or more embodiments.
Figure 9A:
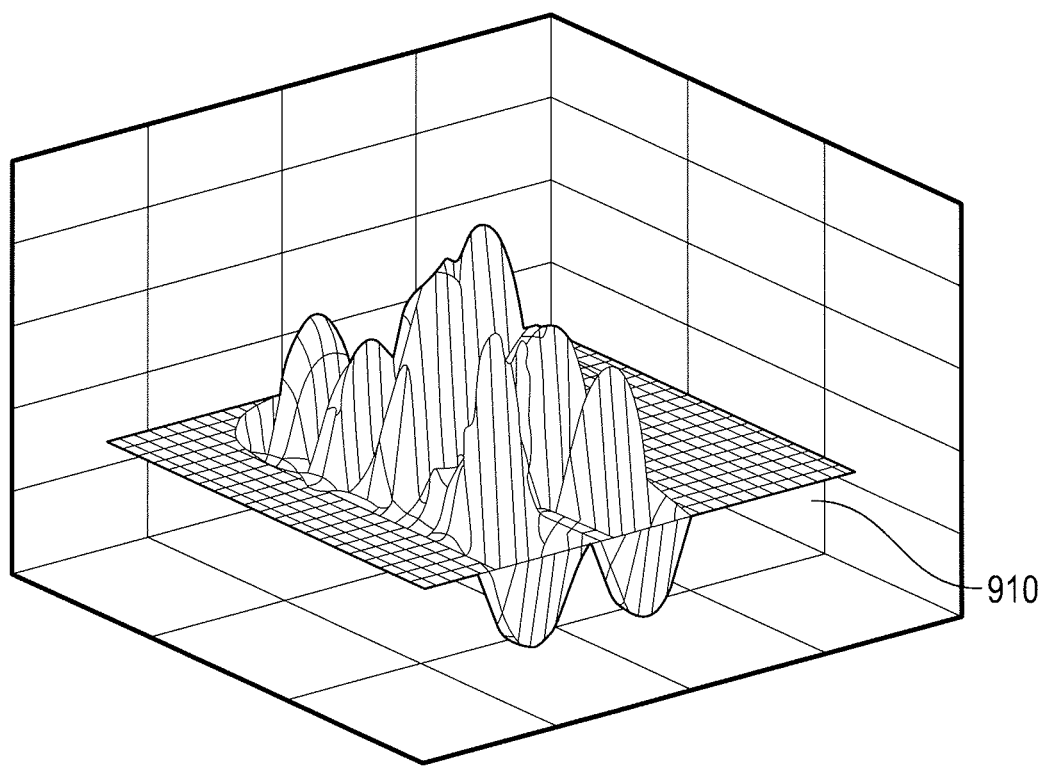
FIGS. 9A, 9B, 9C, 9D, 9E and 9F illustrate graphs of example input object responses, according to one or more embodiments.
Figure 9B:
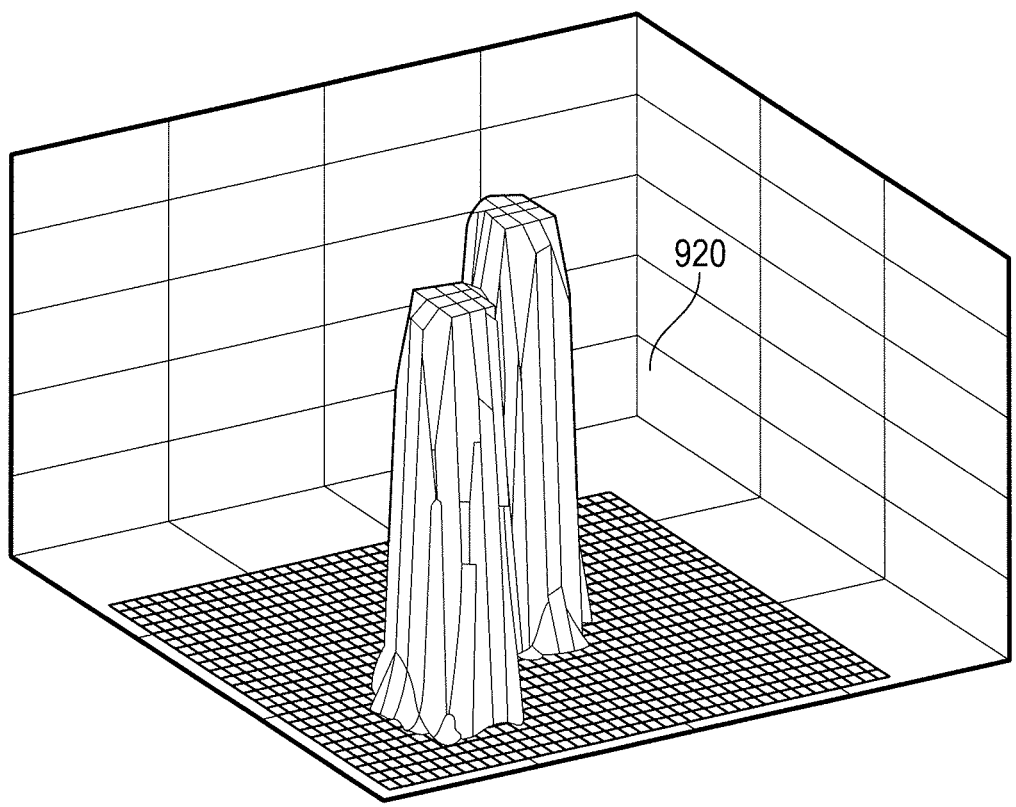

FIG. 8 illustrates movement of one or more input objects within the sensing region 120, e.g., the input object 140 and the input object 840, according to one or more embodiments. As illustrated in FIG. 8, the input object 140 remains stationary as the input object 840 moves along path 842 at a high rate. By averaging the absolute capacitive sensor data of the current capacitive frame with that of the previous capacitive frame, errors within the reported positional information of the input object 140 or the input object 840 may be at least minimized. For example, FIG. 9A illustrates a capacitive image 910 acquired while the input object 840 is moving within the sensing region 120. The capacitive image 910 includes artifacts due to the effects of interference and grounding effects of the input object 840. The capacitive image 910 includes multiple peaks, multiple valleys, and negative values making it difficult to determine the position of each input object 140, 840. FIG. 9B illustrates a capacitive image 920 acquired while the input object 840 is moving but is free from effects of interference or grounding effects of the input object 840 due to the application of one or more methods described herein. As compared to the capacitive image 910, the capacitive image 920 includes two discernable peaks, making it possible to detect the position of each of the input objects 140 and 840.

Figure 9C:
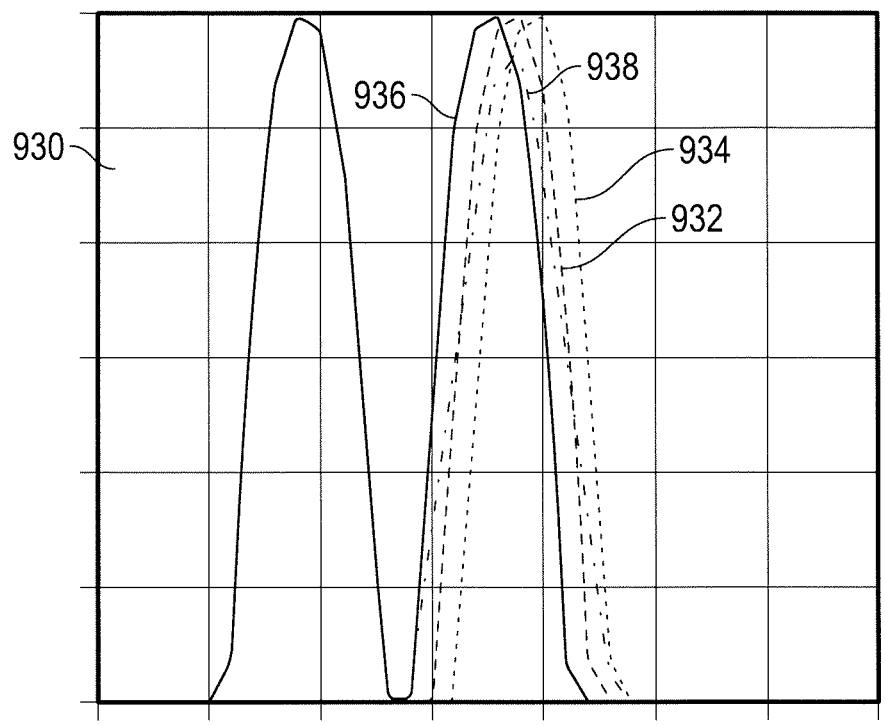
Figure 9D:
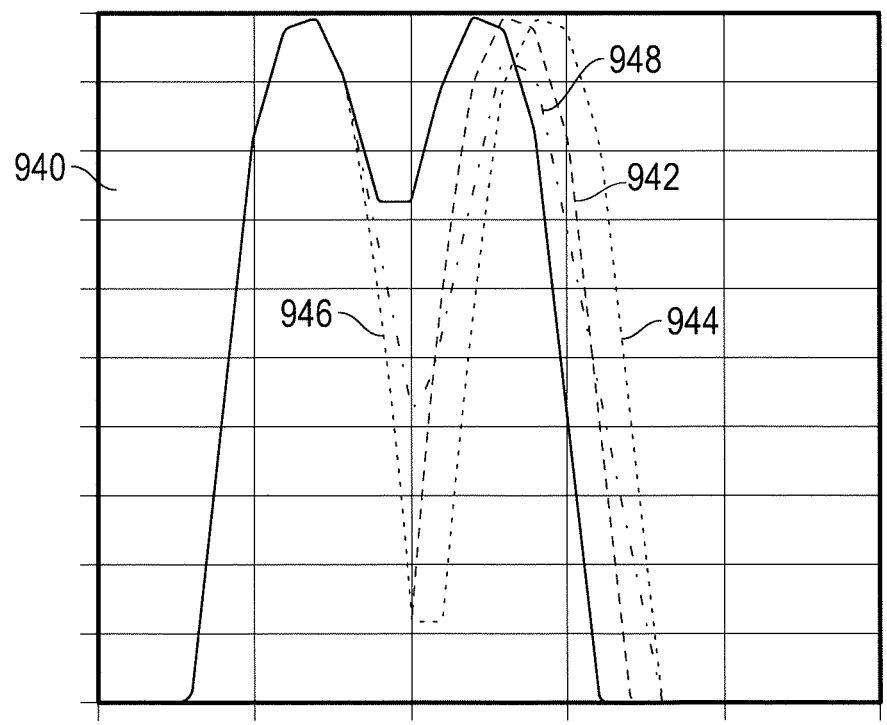

FIGS. 9C and 9D illustrate graphs 930 and 940, respectively. The graph 930 of FIG. 9C depicts an ideal profile 932, where no input object moved during acquisition of the corresponding transcapacitive sensor data and absolute capacitive sensor data, a current profile 934 determined from the absolute capacitive data of the current capacitive frame, a previous profile 936 determined from the absolute capacitive data of the previous capacitive frame, and an updated profile 938 determined by comparing the current profile 934 with the previous profile 936. Differences between the profiles 934 and 936 and the ideal profile 932 are present as during the acquisition of the corresponding sensor data an input object 840 moved within the sensing region 120. However, by combining the current profile 934 with the previous profile 936 as described above with in the embodiment FIG. 7, the position of the peak in the updated profile 938 is similar to that of the ideal profile 932, which may improve the ability of the determination module 212 to accurately determine the position of the input object 140 and/or input object 840.

The graph 940 of FIG. 9D depicts an ideal profile 942, where no input object moved during acquisition of the corresponding transcapacitive sensor data and absolute capacitive sensor data, a current profile 944 determined from the absolute capacitive data of the current capacitive frame, a previous profile 946 determined from the absolute capacitive data of the previous capacitive frame, and an updated profile 948 determined by comparing the current profile 944 with the previous profile 946. Differences between the profiles 944 and 946 and the ideal profile 942 are present as during the acquisition of the corresponding sensor data the input object 840 moved within the sensing region 120. However, by combining the current profile 944 with the previous profile 946 as described above in the embodiment of FIG. 8, the position of the peak in the updated profile 948 is similar to that of the ideal profile 942, which may improve the ability of the determination module 112 to accurately determine the position of the input object 140 and/or input object 840.

Figure 9E:
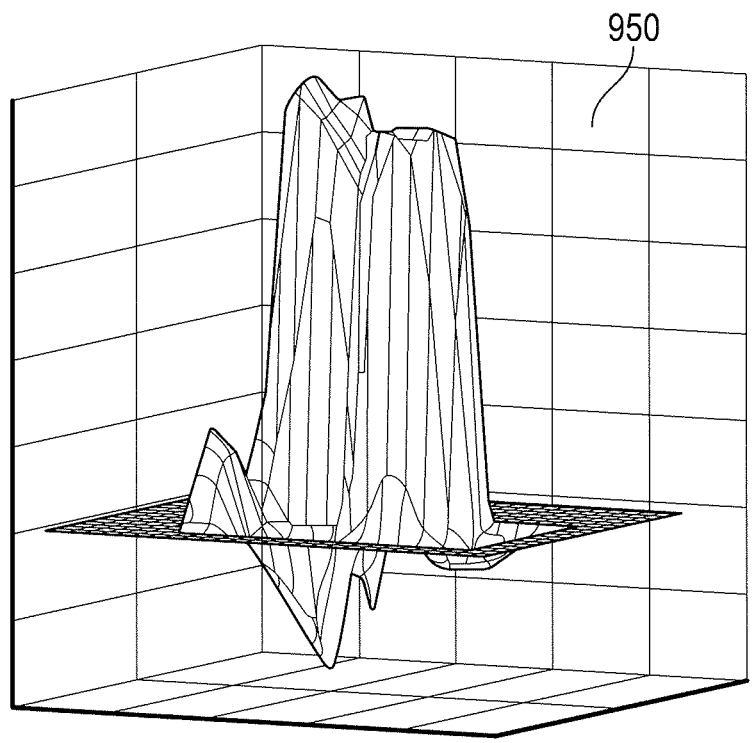
Figure 9F:
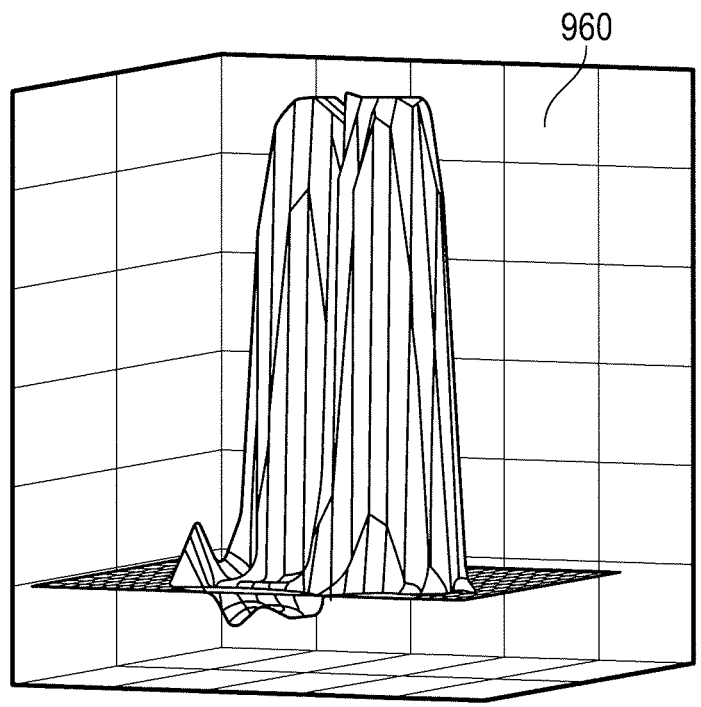

FIGS. 9E and 9F illustrate a corrected image 950 and a corrected image 960, respectively, according to one or more embodiments. The corrected image 950 may be generated from transcapacitive sensor data and absolute capacitive sensor data that include motion artifacts due to motion of input object 840 within the sensing region 120. The corrected image 960 may be generated from transcapacitive sensor data and absolute capacitive sensor data that have been corrected using the methods described above with to suppress artifacts due to motion of input object 840 within the sensing region 120. As can be seen in FIGS. 9E and 9F, the corrected image 960 comprises two discernable peaks and less noise and a reduction of negative values as compared to the corrected image 950.

Figure 10:
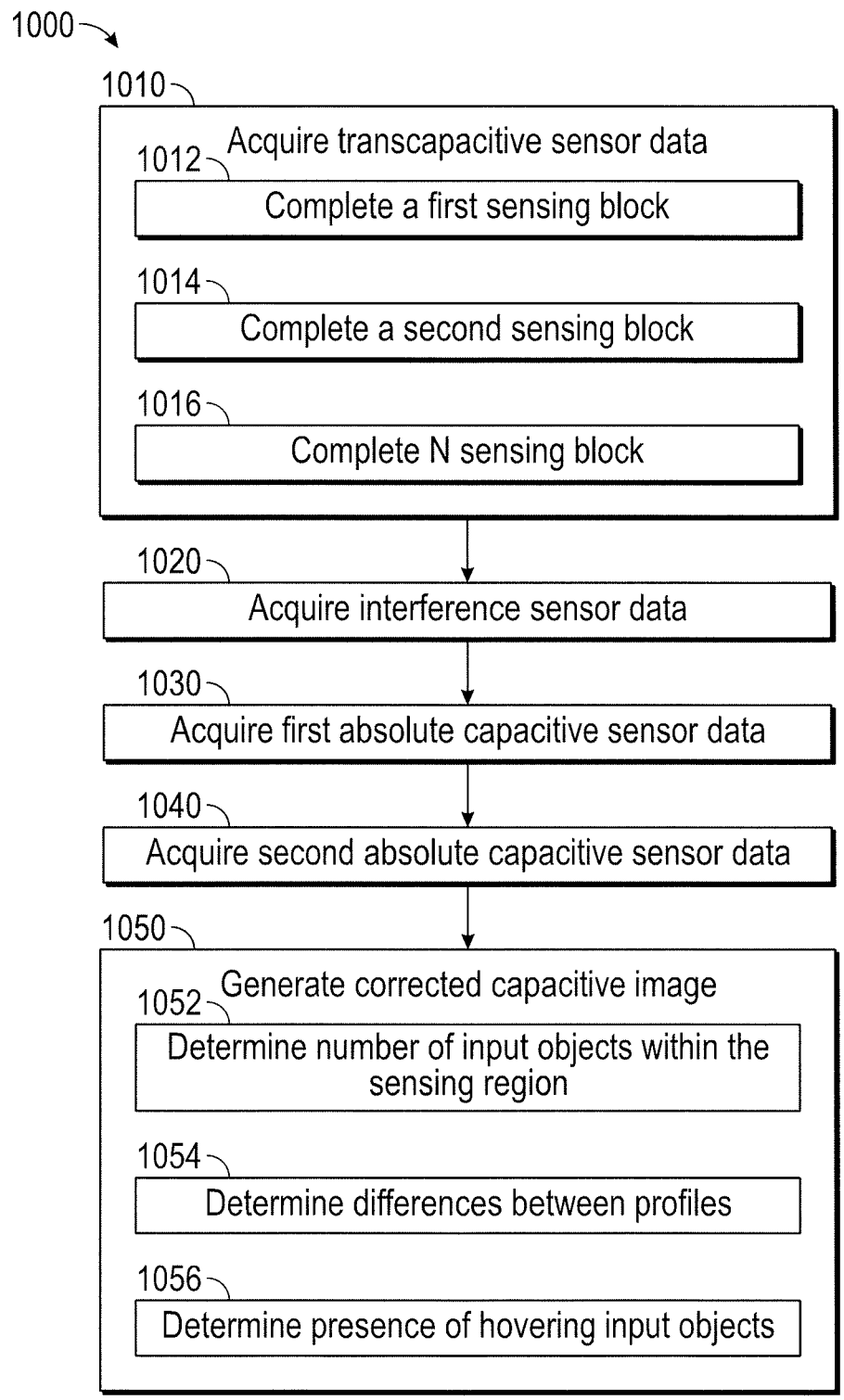
FIG. 10 is a flow diagram of a method for performing capacitive sensing, according to one or more embodiments.

FIG. 10 illustrates a flow chart of a method 1000 for acquiring sensor data during a capacitive frame, according to one or more embodiments. At operation 1010, transcapacitive sensor data is acquired. For example, a first one or more of the sensor electrodes 220 may be operated as transmitter electrodes and a second one or more of the sensor electrodes 220 may be operated as receiver electrodes to acquire the transcapacitive sensor data during one or more transcapacitive sensing blocks 310. In one embodiment, acquiring the transcapacitive sensor data includes: operation 1012, completing a first transcapacitive sensing block, e.g., the transcapacitive sensing block 310$_1$; operation 1014, completing a second sensing block, e.g., the transcapacitive sensing block 310$_2$; and operation 1016 completing an N sensing block, where N is any integer greater than 2.

At operation 1020, interference sensor data is acquired. For example, the sensor module 210 may acquire interference sensor data from the sensor electrodes 222 and/or 224 during one or more interference sensing blocks 330.

At operation 1030, first absolute capacitive sensor data is acquired. For example, the sensor module 210 may be configured to acquire first absolute capacitive sensor data during the absolute capacitive sensing block 320$_1$ by operating the sensor electrodes 222 for absolute capacitive sensing. The operation 1030 may be completed after the operation 1010.

At operation 1040, second absolute capacitive sensor data is acquired. For example, the sensor module 210 may be configured to acquire second absolute capacitive sensor data by operating the sensor electrodes 224 during the absolute capacitive sensing block 320$_2$ for absolute capacitive sensing. In one embodiment, the operation 1040 may be completed after the operation 1030. Alternately, the operation 1040 may be completed before the operation 1030.

At operation 1050, a corrected capacitive image is generated. In one embodiment, the transcapacitive sensor data, and the first and second absolute capacitive sensor data are communicated from the sensor module 210 to the determination module 212. The determination module 212 determines a first transcapacitive profile along the sensor electrodes 222 and a second transcapacitive profile along sensor electrodes 224 from the transcapacitive sensor data, a first absolute capacitive profile from the first absolute capacitive sensor data, and a second absolute capacitive profile from the second absolute capacitive sensor data. In one embodiment, to generate the corrected capacitive image, the determination module 212 compares the first transcapacitive profile with the first absolute capacitive profile to generate a first correction coefficient and/or compares the second transcapacitive profile with the second absolute capacitive profile to generate a second correction coefficient. The first and/or second correction coefficients may be applied to the transcapacitive sensor data to generate first and second adjusted transcapacitive sensor data and the first and/or second adjusted transcapacitive sensor data may be utilized to generate the corrected capacitive image.

In one embodiment, the determination module 212 determines whether or not artifacts may be present in the transcapacitive sensor data. For example, the determination module 212 may determine a number of input objects in the sensing region at operation 1052. For example, the determination module may determine the number of peaks above a detection threshold in the first and second absolute capacitive profiles, and based on the number of peaks, a corresponding number of input objects may be determined to be in the sensing region 120. If either absolute capacitive profile includes more than one peak above a detection threshold, the presence of two or more input objects may be determined. In one embodiment, the corrected capacitive image is generated when a single input object is determined to be present within the sensing region 120.

At operation 1054, a difference between the first transcapacitive profile and the first absolute capacitive profile and/or the second transcapacitive profile and the second absolute capacitive profile is determined. For example, the determination module 212 may compare the second transcapacitive profile with the second absolute capacitive profile to determine if there is a difference in shape between the profiles. Alternatively, or additionally, the determination module 212 compares the first transcapacitive profile with the first absolute capacitive profile to determine if there is a difference in shape between the profiles. In one embodiment, the determination module 212 compares the number of peaks within the profiles and/or the width of the peaks to determine if the shape differs between profiles. If a difference in shape is determined, the determination module 212 determines that one or more artifacts are present within the transcapacitive sensor data.

At operation 1056, the presence of hovering input objects is detected. For example, the determination module 212 determines whether or not input objects exists within the sensing region 120 that are not in contact within an input surface of the input device 100. An input object in the sensing region 120 that is not in contact with the input surface of the input device 100 may be in the hovering region of the sensing region 120 and may be referred to as a hovering input object. In one embodiment, the determination module 212 compares the first absolute capacitive sensing profiles and the second absolute capacitive profile to a first threshold and to a second threshold to determine if there any hovering input objects. For example, if either profile comprises a peak that has a value that exceeds the first threshold and not the second threshold, the presence of hovering input object may be determined.

Figure 11A:
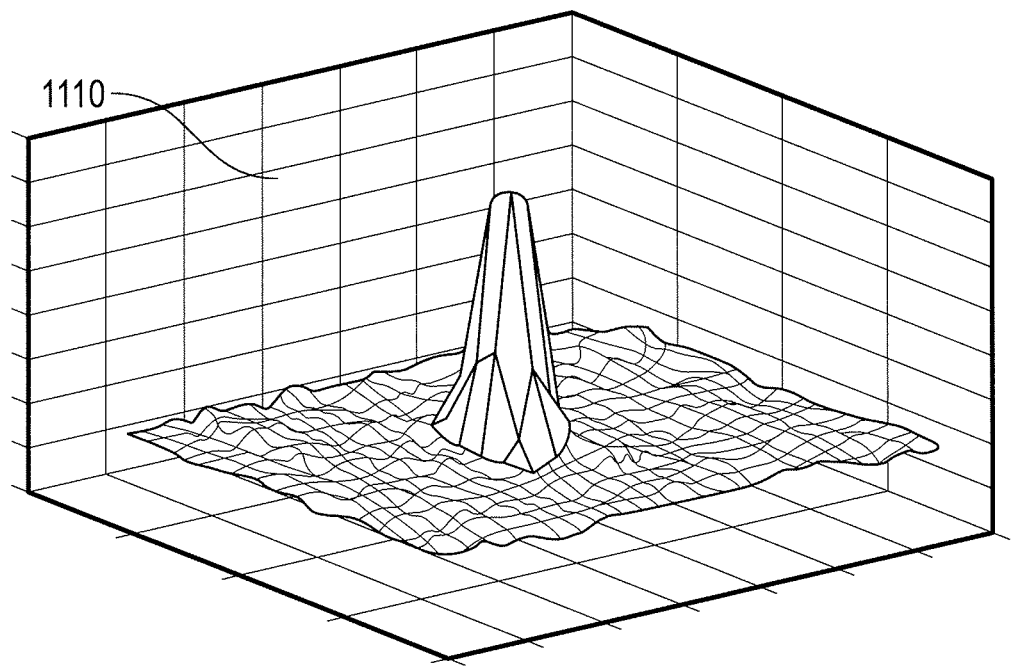
FIGS. 11A, 11B, 11C, 11D, 11E and 11F illustrate graphs of example input object responses, according to one or more embodiments.
Figure 11B:
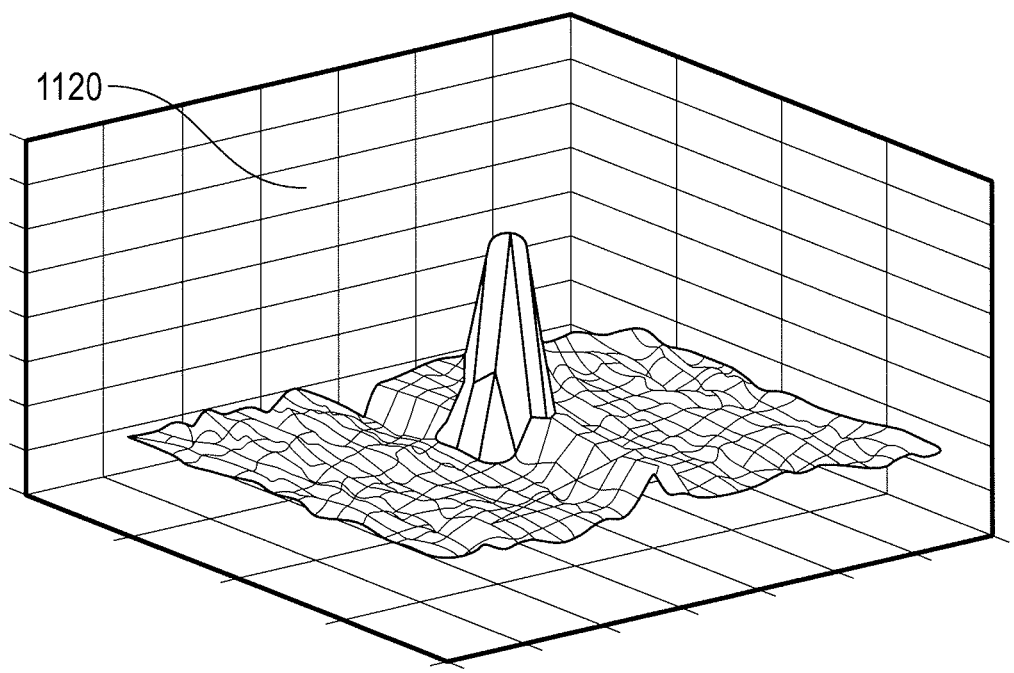
Figure 11C:
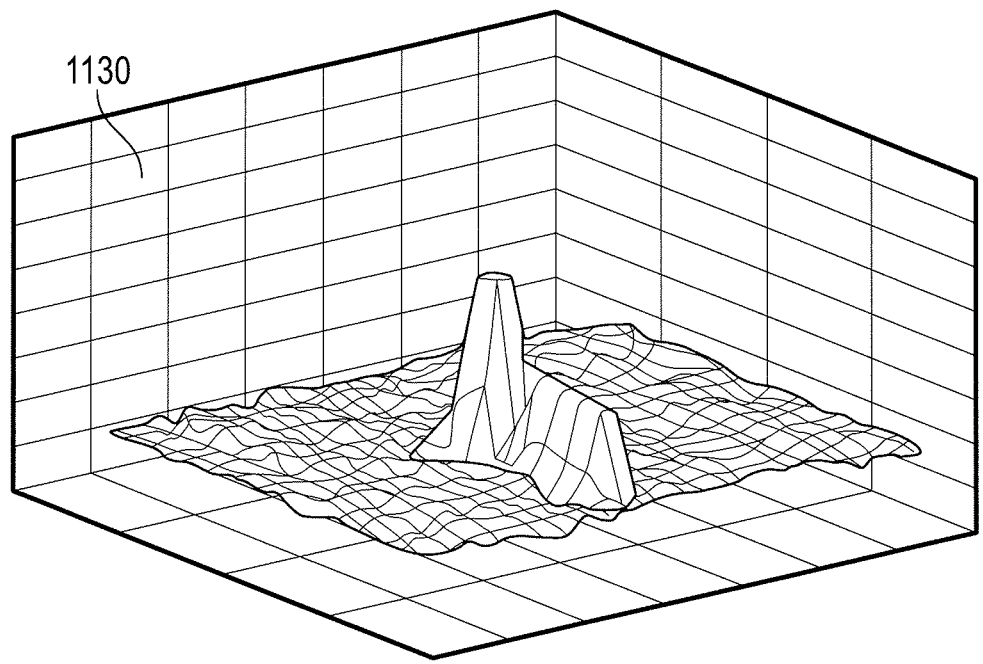
Figure 11D:
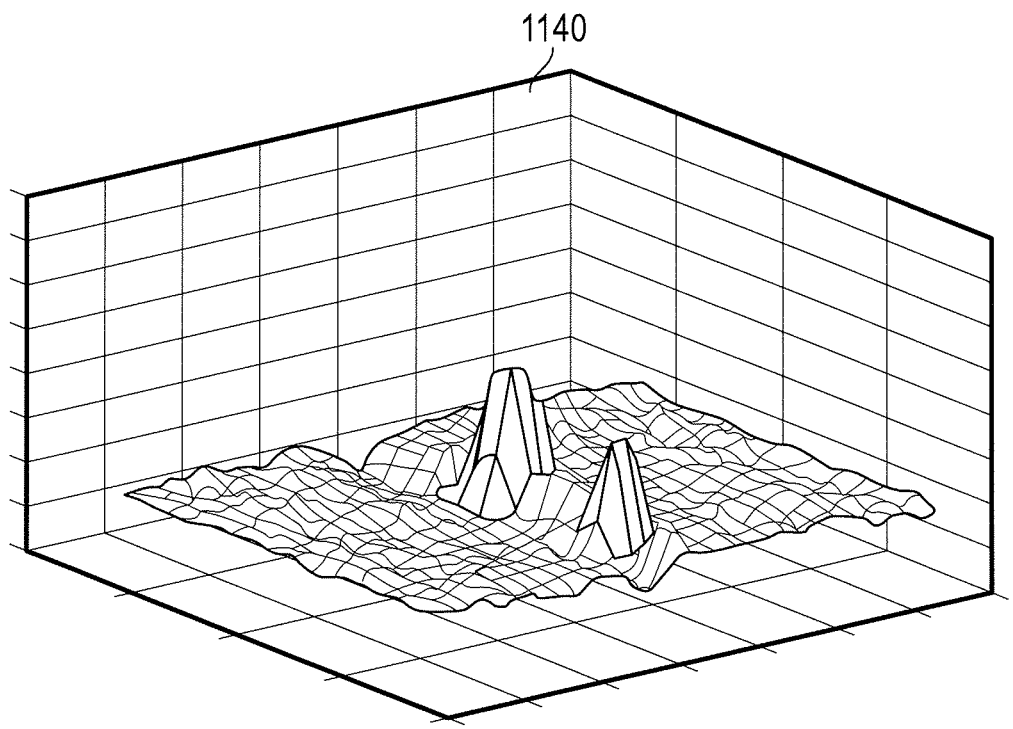
Figure 11E:
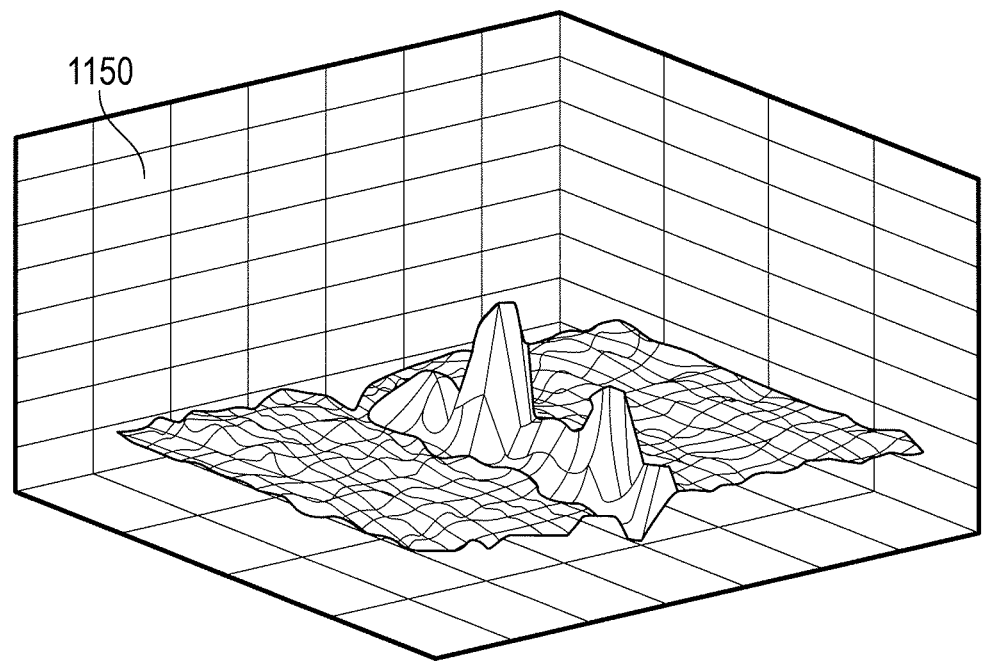
Figure 11F:
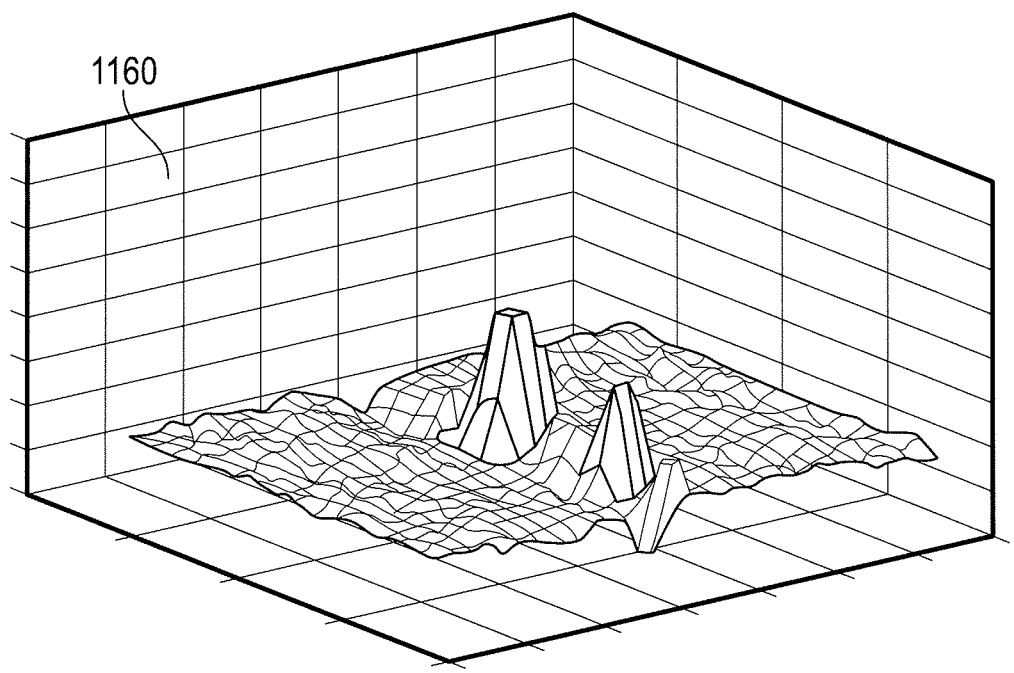

In one embodiment, if more than one input object is determined to be present, and/or if a hovering input object is present, the determination module 212 may determine to not generate a corrected capacitive image. However, if a single input object is detected, no hovering input objects are detected, and artifacts are determined to be present within the transcapacitive sensor data, a corrected capacitive image may be generated. FIGS. 11A-11F illustrate capacitive images having differing levels of artifacts. FIG. 11A illustrates capacitive image 1110 having substantially no artifacts. FIGS. 11B, 11C, 11D, 11E, and 11F illustrate capacitive images 1120, 1130, 1140, 1150 and 1160, respectively, having artifacts due to the input object 140 entering the sensing region 120 while the transcapacitive sensor data is acquired. The artifacts may make it difficult for the determination module 212 to accurately determine the number of input objects and/or the positional information of the input objects.

Figure 12A:
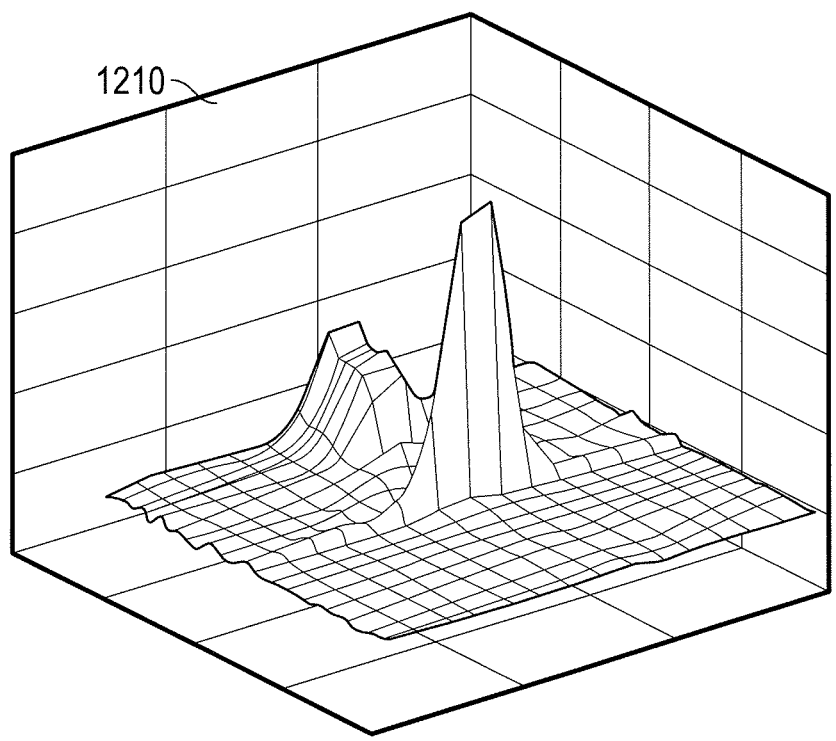
FIGS. 12A, 12B, 12C, and 12D illustrate graphs of example input object responses, according to one or more embodiments.
Figure 12B:
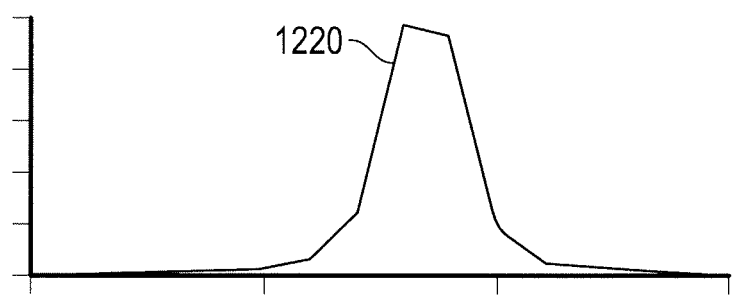
Figure 12B:
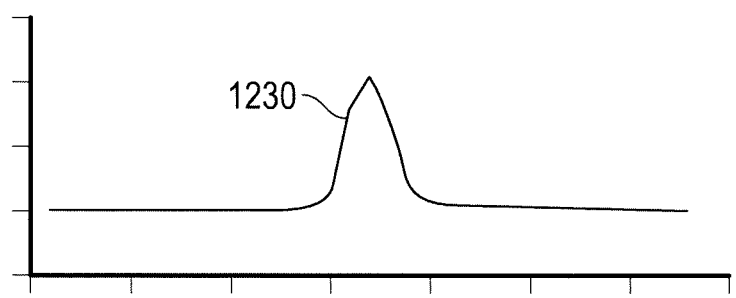
Figure 12C:
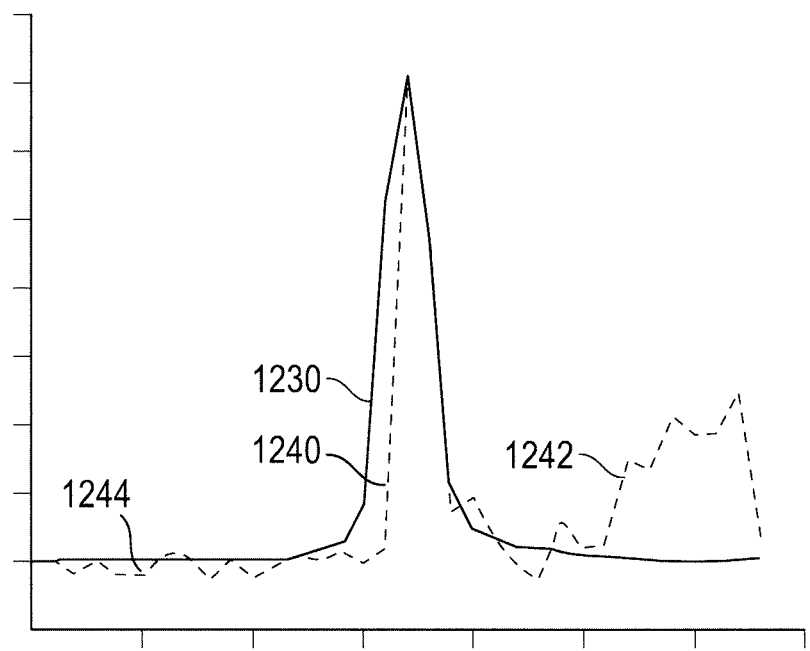
Figure 12D:
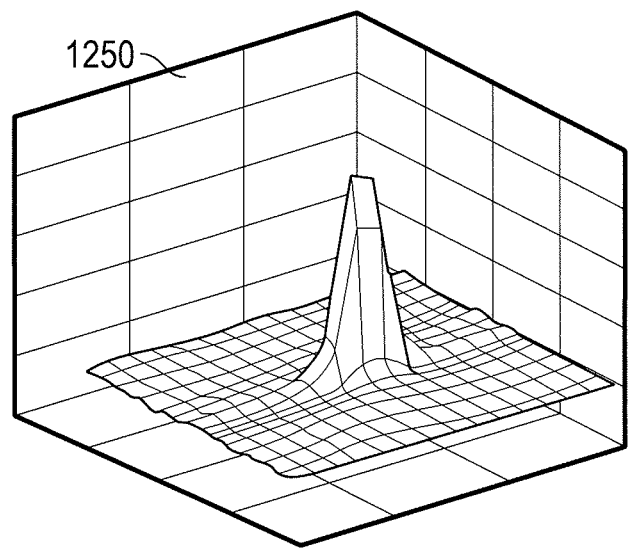

In one embodiment, the determination module 212 adjusts the transcapacitive sensor data based on the first and/or second absolute capacitive sensor data to generate the corrected capacitive image. For example, as illustrated in FIGS. 12A-12D, the determination module 212 compares a first transcapacitive profile 1240 determined by combining the transcapacitive sensor data along sensor electrodes 224 with an absolute capacitive profile 1230 generated from the absolute capacitive data acquired from sensor electrodes 224 to generate one or more correction coefficients. The correction coefficients may be employed to generate the corrected image 1260. FIG. 12A illustrates an uncorrected image 1210. FIG. 12B illustrates an absolute capacitive profile 1220 generated from the absolute capacitive data acquired from sensor electrodes 222, and the absolute capacitive profile 1230. FIG. 12C illustrates the transcapacitive profile 1240 and the absolute capacitive profile 1230. In one embodiment, generating the corrected image 1260 may include adjusting the values of the transcapacitive profile 1240 such that the transcapacitive profile 1240 is at least similar in shape to that the absolute capacitive profile 1230. For example, in region 1242, the values of the transcapacitive profile 1240 may be decreased, in region 1244, the values of the transcapacitive profile 1240 may be increased, and, in region 1246, the shape of the transcapacitive profile 1240 may be adjusted such that width of the peak of the transcapacitive profile 1240 is similar to that of the peak of the absolute capacitive profile 1230 to generate one or more coefficients which may be applied to the transcapacitive sensor data. The adjusted transcapacitive sensor data may be then utilized to generate the corrected capacitive image. In one embodiment, a scaled outer product of the absolute capacitive profile 1230 and/or 1220 may be determined and applied to the transcapacitive sensor data to generate the corrected capacitive image 1250.

In one embodiment, the determination module 212 may employ a non-linear optimization based on the matrix generated from the plurality of codes used to generate the transcapacitive sensing signals and the distorted transcapacitive sensor data to determine the corrected capacitive image 1250. In such an embodiment, the determination module 212 may determine a location of the input object 140 from the first and second absolute capacitive sensor data, and utilize the location of the input object 140 to initialize the non-linear optimization.

In one embodiment, a method for capacitive sensing comprises acquiring first capacitive sensor data from a plurality of sensor electrodes during a first capacitive frame, acquiring second capacitive sensor data from the plurality of sensor electrodes during the capacitive frame, and determining positional information from one or more input objects based on the first capacitive sensor data and the second capacitive sensor data. Acquiring the first capacitive sensor data comprises driving first sensor electrodes of the plurality of sensor electrodes with transcapacitive sensing signals during a first sensing block of the capacitive frame, driving second sensor electrodes of the plurality of sensor with the transcapacitive sensing signals during a second sensing block of the first capacitive frame, receiving first resulting signals from third sensor electrodes of the plurality of sensor electrodes during the first sensing block and receiving second resulting signals from the third sensor electrodes during the second sensing block. Each of the transcapacitive sensing signals is based on a respective one of a plurality of codes.

In one embodiment, a processing system comprises a sensor module, and a determination module. The sensor module comprises sensor circuitry and is coupled to a plurality of sensor electrodes. Further, the sensor module is configured to acquire first capacitive sensor data from a plurality of sensor electrodes during a first capacitive frame by driving first sensor electrodes of the plurality of sensor electrodes with transcapacitive sensing signals during a first sensing block of the capacitive frame, driving second sensor electrodes of the plurality of sensor with the transcapacitive sensing signals during a second sensing block of the first capacitive frame, receiving first resulting signals from third sensor electrodes of the plurality of sensor electrodes during the first sensing block, and receiving second resulting signals from the third sensor electrodes during the second sensing block. Each of the transcapacitive sensing signals is based on a respective one of a plurality of codes. The sensor module is further configured to acquire second capacitive sensor data from the plurality of sensor electrodes during the first capacitive frame. The determination module is configured to determine positional information for one or more input objects based on the first capacitive sensor data and the second capacitive sensor data.

In one embodiment, an input device comprises a plurality of sensor electrodes and a processing system. The processing system is coupled to the plurality of sensor electrodes and is configured to acquire first capacitive sensor data from the plurality of sensor electrodes during a first capacitive frame, acquire second capacitive sensor data from the plurality of sensor electrodes during the first capacitive frame, and determine positional information for one or more input objects based on the first capacitive sensor data and the second capacitive sensor data. Acquiring the first capacitive sensor data comprises driving first sensor electrodes of the plurality of sensor electrodes with transcapacitive sensing signals during a first sensing block of the capacitive frame, driving second sensor electrodes of the plurality of sensor with the transcapacitive sensing signals during a second sensing block of the first capacitive frame, receiving first resulting signals from third sensor electrodes of the plurality of sensor electrodes during the first sensing block, and receiving second resulting signals from the third sensor electrodes during the second sensing block. Each of the transcapacitive sensing signals is based on a respective one of a plurality of codes.

In one embodiment, acquiring the second capacitive sensor data comprises acquiring first absolute capacitive sensor data from fourth sensor electrodes of the plurality of sensor electrodes during a third sensing block of the first capacitive frame, and acquiring second absolute capacitive sensor data from fifth sensor electrodes of the plurality of sensor electrodes during a fourth sensing block of the first capacitive frame. The third sensing block occurs before the first sensing block, and the first sensing block occurs before second sensing block. Further, the fourth sensing block occurs after the second sensing block.

In one embodiment, determining the positional information for the one or more input objects comprises comparing the first absolute capacitive sensor data with the second absolute capacitive sensor data, and adjusting the first capacitive sensor data based on a difference between first absolute capacitive sensor data and the second absolute capacitive sensor data.

In one embodiment, adjusting the first capacitive sensor data comprises at least one of adjusting a threshold of a first filter applied to the first capacitive sensor data, adjusting one or more parameters of a second filter applied to the positional information, and adjusting a correction algorithm applied to the first capacitive sensor data and the second capacitive sensor data.

In one embodiment, comparing the first absolute capacitive sensor data with the second absolute capacitive sensor data comprises comparing a sum of the first absolute capacitive sensor data with a sum of the second absolute capacitive sensor data.

In one embodiment, the second capacitive sensor data of the first capacitive frame is compared with second capacitive sensor data of a second capacitive frame, and generating updated second capacitive sensor data of the first capacitive frame based on the comparison. The first capacitive frame is acquired after the second capacitive frame. Further, determining the positional information for the one or more input objects based on the first capacitive sensor data and the second capacitive sensor data comprises determining the positional information based on the first capacitive sensor data and the updated second capacitive sensor data.

In one embodiment, acquiring the second capacitive sensor data comprises acquiring first absolute capacitive sensor data from fourth sensor electrodes of the plurality of sensor electrodes during a third sensing block of the first capacitive frame, and acquiring second absolute capacitive sensor data from fifth sensor electrodes of the plurality of sensor electrodes during a fourth sensing block of the first capacitive frame. Comparing the second capacitive sensor data of the first capacitive frame with the second capacitive sensor data of the second capacitive frame comprises comparing the first absolute capacitive sensor data of the first capacitive frame with first absolute capacitive sensor data of the second capacitive frame, and comparing the second absolute capacitive sensor data of the first capacitive frame with second absolute capacitive sensor data of the second capacitive frame. Further, generating updated second capacitive sensor data comprises generating updated first absolute capacitive sensor data and updated second absolute capacitive sensor data for the first capacitive frame.

In one embodiment, comparing the first absolute capacitive sensor data of the first capacitive frame with first absolute capacitive sensor data of the second capacitive frame comprises generating an average of the first absolute capacitive sensor data of the first capacitive frame and the first absolute capacitive sensor data of the second capacitive frame. Further, comparing the second absolute capacitive sensor data of the first capacitive frame with the second absolute capacitive sensor data of the second capacitive frame comprises generating an average of the second absolute capacitive sensor data of the first capacitive frame and the second absolute capacitive sensor data of the second capacitive frame.

In one embodiment, determining an average of the first absolute capacitive sensor data of the first capacitive frame and the first absolute capacitive sensor data of the second capacitive frame, and an average of the second absolute capacitive sensor data of the first capacitive frame and the second absolute capacitive sensor data of the second capacitive frame comprises performing a spatial Fourier transform on the first and second absolute capacitive sensor data of the first capacitive frame and the first and second absolute capacitive sensor data of the second capacitive frame to determine a phase of each of the first and second absolute capacitive sensor data of the first capacitive frame and the first and second absolute capacitive sensor data of the second capacitive frame, generating an average of the phase of the first absolute capacitive sensor data of the first capacitive frame and the phase of the first absolute capacitive sensor data of the second capacitive frame, and generating an average of the phase of the second absolute capacitive sensor data of the first capacitive frame and the phase of the second absolute capacitive sensor data of the second capacitive frame.

In one embodiment, comparing the first absolute capacitive sensor data of the first capacitive frame with first absolute capacitive sensor data of the second capacitive frame comprises linearly interpolating between the first absolute capacitive sensor data of the first capacitive frame and the first absolute capacitive sensor data of the second capacitive frame. Further, comparing the second absolute capacitive sensor data of the first capacitive frame with the second absolute capacitive sensor data of the second capacitive frame comprises linearly interpolating between the second absolute capacitive sensor data of the first capacitive frame and the second absolute capacitive sensor data of the second capacitive frame.

In one embodiment, linearly interpolating between the first absolute capacitive sensor data of the first capacitive frame and the first absolute capacitive sensor data of the second capacitive frame, and linearly interpolating between the second absolute capacitive sensor data of the first capacitive frame and the second absolute capacitive sensor data of the second capacitive frame comprises applying different weighting factors to the plurality of sensor electrodes.

In one embodiment, third capacitive sensor data is acquired during the first capacitive frame. The second capacitive sensor data is compared with the third capacitive sensor data, wherein the second capacitive sensor data is acquired before the first capacitive sensor data and the third capacitive sensor data is acquired after the first capacitive sensor data. Further updated second capacitive sensor data is generated based on the comparison. Additionally, determining the positional information for the one or more input objects based on the first capacitive sensor data and the second capacitive sensor data comprises determining the positional information based on the first capacitive sensor data and the updated second capacitive sensor data.

In one embodiment, comparing the second capacitive sensor data with the third capacitive sensor data comprises averaging the second capacitive sensor data with the third capacitive sensor data.

In one embodiment, acquiring the second capacitive sensor data comprises acquiring first absolute capacitive sensor data from fourth sensor electrodes of the plurality of sensor electrodes during a third sensing block of the first capacitive frame, and acquiring second absolute capacitive sensor data from fifth sensor electrodes of the plurality of sensor electrodes during a fourth sensing block of the first capacitive frame. Further, the third sensing block and the fourth sensing block occur after the second sensing block and the second sensing block occurs after the first sensing block. Additionally, determining the positional information for the one or more input objects comprises detecting one or more artifacts in the first capacitive sensor data, and adjusting the first capacitive sensor data in response to detecting the one or more artifacts.

In one embodiment, detecting the one or more artifacts comprises determining a number of the one or more input objects based on the second capacitive sensor data, detecting a mismatch between the first capacitive sensor data and the second capacitive sensor data, and determining a presence of one or more hovering input objects. Further, adjusting the first capacitive sensor data in response to detecting the one or more artifacts comprises adjusting the first capacitive sensor data based on at least one of a determination that the number of the one or more input objects is one, a detection of the mismatch between the first capacitive sensor data and the second capacitive sensor data, and a determination of a lack of a presence of hovering input objects.

In one embodiment, adjusting the first capacitive sensor data comprises detecting a distorted portion of the first capacitive sensor data, and adjusting the distorted portion of the first capacitive sensor data at least partially based on the second capacitive sensor data.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

What is claimed is:

1. A method for capacitive sensing comprising:
acquiring first capacitive sensor data from a plurality of sensor electrodes by operating the plurality of sensor electrodes for trans capacitive sensing signals during one or more trans capacitive sensing blocks;
acquiring second capacitive sensor data from the plurality of sensor electrodes by operating the sensor electrodes for absolute capacitive sensing during a first one or more absolute capacitive sensing blocks, wherein acquiring the second capacitive sensor data by operating the sensor electrodes for absolute capacitive sensing during the first one or more absolute capacitive sensing blocks comprises:
acquiring first absolute capacitive sensor data from first sensor electrodes of the plurality of sensor electrodes during a first absolute capacitive sensing block, wherein the first absolute capacitive sensing block occurs before the one or more transcapacitive sensing blocks; and
acquiring second absolute capacitive sensor data from second sensor electrodes of the plurality of sensor electrodes during a second absolute capacitive sensing block, and wherein the second absolute capacitive sensing block occurs after the one or more transcapacitive sensing blocks;
and determining positional information for one or more input objects based on the first capacitive sensor data and the second capacitive sensor data.

2. The method of claim 1, wherein determining the positional information for the one or more input objects comprises:
comparing the first absolute capacitive sensor data with the second absolute capacitive sensor data; and adjusting the first capacitive sensor data based on a difference between first absolute capacitive sensor data and the second absolute capacitive sensor data.

3. A method for capacitive sensing comprising:
acquiring first capacitive sensor data from a plurality of sensor electrodes by operating the plurality of sensor electrodes for trans capacitive sensing signals during one or more trans capacitive sensing blocks;
acquiring second capacitive sensor data from the plurality of sensor electrodes by operating the sensor electrodes for absolute capacitive sensing during a first one or more absolute capacitive sensing blocks;
acquiring third capacitive sensor data from the plurality of sensor electrodes by operating the plurality of sensor electrodes for absolute capacitive sensing during a second one or more absolute capacitive sensing blocks, wherein the first one or more absolute capacitive sensing blocks occur before the one or more transcapacitive sensing blocks and the second one or more absolute capacitive sensing blocks occur after the one or more transcapacitive sensing blocks;
comparing the second capacitive sensor data with the third capacitive sensor data; and
determining positional information for one or more input objects based on the first capacitive sensor data and the second capacitive sensor data, wherein determining the positional information for the one or more input objects is further based on the comparison of the second capacitive sensor data with the third capacitive sensor data.

4. The method of claim 3, wherein:
acquiring the second capacitive sensor data comprises:
acquiring first absolute capacitive sensor data from first sensor electrodes of the plurality of sensor electrodes during a first absolute capacitive sensing block; and
acquiring second absolute capacitive sensor data from second sensor electrodes of the plurality of sensor electrodes during a second absolute capacitive sensing block, wherein the first and second absolute capacitive sensing blocks occur before the one or more transcapacitive sensing blocks; acquiring the third capacitive sensor data comprises:
acquiring third absolute capacitive sensor data from the first sensor electrodes during a third absolute capacitive sensing block; acquiring fourth absolute capacitive sensor data from the second sensor electrodes during a fourth absolute capacitive sensing block, and wherein the third and fourth absolute capacitive sensing blocks occur after the one or more transcapacitive sensing blocks; and comparing the second capacitive sensor data with the third capacitive sensor data comprises: comparing the first absolute capacitive sensor data with the third absolute capacitive sensor data; and comparing the second absolute capacitive sensor data with the fourth absolute capacitive sensor data to generate updated absolute capacitive sensor data.

5. A processing system comprising:
a sensor module comprising sensor circuitry, the sensor module coupled to a plurality of sensor electrodes and configured to:
acquire first capacitive sensor data from the plurality of sensor electrodes by operating the plurality of sensor electrodes for trans capacitive sensing signals during one or more transcapacitive sensing blocks; and
acquire second capacitive sensor data from the plurality of sensor electrodes by operating the sensor electrodes for absolute capacitive sensing during a first one or more absolute capacitive sensing blocks, wherein acquiring the second capacitive sensor data comprises:
acquiring first absolute capacitive sensor data from first sensor electrodes of the plurality of sensor electrodes during a first absolute capacitive sensing block, wherein the first absolute capacitive sensing block occurs before the one or more transcapacitive sensing blocks; and
acquiring second absolute capacitive sensor data from second sensor electrodes of the plurality of sensor electrodes during a second absolute capacitive sensing block, and wherein the second absolute capacitive sensing block occurs after the one or more transcapacitive sensing blocks; and a determination module configured to determine positional information for one or more input objects based on the first capacitive sensor data and the second capacitive sensor data.

6. The processing system of claim 5, wherein determining the positional information for the one or more input objects comprises: comparing the first absolute capacitive sensor data with the second absolute capacitive sensor data; and
adjusting the first capacitive sensor data based on a difference between first absolute capacitive sensor data and the second absolute capacitive sensor data.

7. A processing system comprising:
a sensor module comprising sensor circuitry, the sensor module coupled to a plurality of sensor electrodes and configured to:
acquire first capacitive sensor data from the plurality of sensor electrodes by operating the plurality of sensor electrodes for trans capacitive sensing signals during one or more trans capacitive sensing blocks; and
acquire second capacitive sensor data from the plurality of sensor electrodes by operating the sensor electrodes for absolute capacitive sensing during a first one or more absolute capacitive sensing blocks; and
acquire third capacitive sensor data from the plurality of sensor electrodes by operating the plurality of sensor electrodes for absolute capacitive sensing during a second one or more absolute capacitive sensing blocks, wherein the first one or more absolute capacitive sensing blocks occur before the one or more transcapacitive sensing blocks and the second one or more absolute capacitive sensing blocks occur after the one or more transcapacitive sensing blocks;
a determination module configured to determine positional information for one or more input objects based on the first capacitive sensor data and the second capacitive sensor data, compare the second capacitive sensor data with the third capacitive sensor data, and
wherein determining the positional information for the one or more input objects is further based on the comparison of the second capacitive sensor data with the third capacitive sensor data.

8. The processing system of claim 7, wherein:
acquiring the second capacitive sensor data comprises:
acquiring first absolute capacitive sensor data from first sensor electrodes of the plurality of sensor electrodes during a first absolute capacitive sensing block; and
acquiring second absolute capacitive sensor data from second sensor electrodes of the plurality of sensor electrodes during a second absolute capacitive sensing block, and wherein the first and second absolute capacitive sensing blocks occur before the one or more transcapacitive sensing blocks; acquiring the third capacitive sensor data comprises:
acquiring third absolute capacitive sensor data from first sensor electrodes during a third absolute capacitive sensing block; acquiring fourth absolute capacitive sensor data from the second sensor electrodes during a fourth absolute capacitive sensing block, and wherein the third and fourth absolute capacitive sensing blocks occur after the one or more transcapacitive sensing blocks;
and comparing the second capacitive sensor data with the third capacitive sensor data comprises:
comparing the first absolute capacitive sensor data with the third absolute capacitive sensor data;
and comparing the second absolute capacitive sensor data with the fourth absolute capacitive sensor data to generate updated absolute capacitive sensor data.

9. An input device comprising:
a plurality of sensor electrodes; and
a processing system coupled to the plurality of sensor electrodes, the processing system configure d to:
acquire first capacitive sensor data from the plurality of sensor electrodes by operating the plurality of sensor electrodes for trans capacitive sensing signals during one or more trans capacitive sensing blocks;
acquire second capacitive sensor data from the plurality of sensor electrodes by operating the plurality of sensor electrodes for absolute capacitive sensing during a first one or more absolute capacitive sensing blocks, wherein acquiring the second capacitive sensor data comprises:
acquiring first absolute capacitive sensor data from first sensor electrodes of the plurality of sensor electrodes during a first absolute capacitive sensing block, wherein the first absolute capacitive sensing block occurs before the one or more transcapacitive sensing blocks; and
acquiring second absolute capacitive sensor data from second sensor electrodes of the plurality of sensor electrodes during a second absolute capacitive sensing block, and wherein the second absolute capacitive sensing block occurs after the one or more transcapacitive sensing blocks;
and determine positional information for one or more input objects based on the first capacitive sensor data and the second capacitive sensor data.

10. The input device of claim 9 wherein determining the positional information for the one or more input objects comprises:
  comparing the first absolute capacitive sensor data with the second absolute capacitive sensor data; and adjusting the first capacitive sensor data based on a difference between first absolute capacitive sensor data and the second absolute capacitive sensor data.

11. An input device comprising:
  a plurality of sensor electrodes; and
    a processing system coupled to the plurality of sensor electrodes, the processing system configure d to:
  acquire first capacitive sensor data from the plurality of sensor electrodes by operating the plurality of sensor electrodes for trans capacitive sensing signals during one or more trans capacitive sensing blocks;
    acquire second capacitive sensor data from the plurality of sensor electrodes by operating the plurality of sensor electrodes for absolute capacitive sensing during a first one or more absolute capacitive sensing blocks;
  acquire third capacitive sensor data from the plurality of sensor electrodes by operating the plurality of sensor electrodes for absolute capacitive sensing during a second one or more absolute capacitive sensing blocks, wherein the first one or more absolute capacitive sensing blocks occur before the one or more transcapacitive sensing blocks and the second one or more absolute capacitive sensing blocks occur after the one or more transcapacitive sensing blocks;
  compare the second capacitive sensor data with the third capacitive sensor data; and
  determine positional information for one or more input objects based on the first capacitive sensor data and the second capacitive sensor data, wherein the determine the positional information for the one or more input objects is further based on the comparison of the second capacitive sensor data and the third capacitive sensor data.

12. The input device of claim 11, wherein:
acquiring the second capacitive sensor data comprises:
acquiring first absolute capacitive sensor data from first sensor electrodes of the plurality of sensor electrodes during a first absolute capacitive sensing block; and
acquiring second absolute capacitive sensor data from second sensor electrodes of the plurality of sensor electrodes during a second absolute capacitive sensing block, wherein the first and second absolute capacitive sensing blocks occur before the one or more transcapacitive sensing blocks; acquiring the third capacitive sensor data comprises:
acquiring third absolute capacitive sensor data from the first sensor electrodes during a third absolute capacitive sensing block; acquiring fourth absolute capacitive sensor data from the second sensor electrodes during a fourth absolute capacitive sensing block, and wherein the third and fourth absolute capacitive sensing blocks occur after the one or more transcapacitive sensing blocks; and comparing the second capacitive sensor data with the third capacitive sensor data comprises: comparing the first absolute capacitive sensor data with the third absolute capacitive sensor data and the second absolute capacitive sensor data with the fourth absolute capacitive sensor data to generate updated absolute capacitive sensor data.

* * * * *

UNITED STATES PATENT AND TRADEMARK OFFICE
CERTIFICATE OF CORRECTION

PATENT NO.           : 11,061,521 B2
APPLICATION NO.      : 16/533482
DATED                : July 13, 2021
INVENTOR(S)          : Nickolas V. Fotopoulos et al.

Page 1 of 1

It is certified that error appears in the above-identified patent and that said Letters Patent is hereby corrected as shown below:

In the Claims

At Column 31: Lines 60-61, Claim 1, delete "trans capacitive" and add --transcapacitive--.
At Column 32: Line 22, Claim 2, after "and," "adjusting" should start a new paragraph.
At Column 32: Lines 29-30, Claim 3, delete "trans capacitive" and add --transpacitive--.
At Column 32: Line 67, Claim 4, after "block;" "acquiring" should start a new paragraph.
At Column 33: Line 5, Claim 4, after "and," "comparing" should start a new paragraph.
At Column 33: Line 7, Claim 4, "comparing" should start a new paragraph.
At Column 33: Line 8, Claim 4, after "and," "comparing" should start a new paragraph.
At Column 33: Line 18, Claim 5, delete "trans capacitive" and add --transcapacitive--.
At Column 33: Line 36, Claim 5, after "blocks;" "and a determination" should start a new paragraph.
At Column 33: Line 42, Claim 6, after "comprises:" "comparing" should start a new paragraph.
At Column 33: Lines 53-54, Claim 7, delete "trans capacitive" and add --transcapacitive--.
At Column 34: Line 25, Claim 8, after "block;" "acquiring" should start a new paragraph.
At Column 34: Line 31, Claim 8, the first word, "and" should be at the end of Line 30 after "blocks;".
At Column 34: Line 36, Claim 8, the first word, "and" should be at the end of Line 35 after "data;".
At Column 34: Line 42, Claim 9, delete "configure d" and add --configured--.
At Column 34: Lines 45-46, Claim 9, delete "trans capacitive" and add --transcapacitive--.
At Column 35: Line 5, Claim 10, after "and," "adjusting" should start a new paragraph.
At Column 35: Line 12, Claim 11, delete "configure d" and add --configured--.
At Column 35: Lines 15-16, Claim 11, delete "trans capacitive" and add --transcapacitive--.
At Column 36: Line 22, Claim 12, after "block;" "acquiring" should start a new paragraph.
At Column 36: Line 27, Claim 12, after "and," "comparing" should start a new paragraph.
At Column 36: Line 29, Claim 12, the first word, "comparing," should start a new paragraph.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*